United States Patent
Luo et al.

(10) Patent No.: US 7,552,099 B2
(45) Date of Patent: Jun. 23, 2009

(54) SYSTEM AND METHOD FOR INDEXING A DATA STREAM

(75) Inventors: Gang Luo, Yorktown Heights, NY (US); Kun-Lung Wu, Yorktown Heights, NY (US); Philip Shi-lung Yu, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 352 days.

(21) Appl. No.: 11/373,022

(22) Filed: Mar. 10, 2006

(65) Prior Publication Data

US 2007/0214163 A1 Sep. 13, 2007

(51) Int. Cl.
*G06E 1/00* (2006.01)
*G06E 3/00* (2006.01)

(52) U.S. Cl. .............................. 706/21; 707/101; 705/1

(58) Field of Classification Search ................ None
See application file for complete search history.

(56) References Cited

OTHER PUBLICATIONS

Yuan=Chi Chang et al., "The Onion Technique: Indexing for Linear Optimization Queries", SIGMOD Conf. 2000; pp. 391-402.

*Primary Examiner*—David R Vincent
*Assistant Examiner*—Kalpana Bharadwaj
(74) *Attorney, Agent, or Firm*—Keusey, Tutunjian & Bitetto, P.C.; Kenneth R. Corsello, Esq.

(57) ABSTRACT

There are provided methods, computer program products, and systems for indexing a data stream. A method for indexing a data stream having attribute values includes the steps of parsing the data stream, and forming an index of tuples for a subset of attribute values of the data stream. The index is configured for retrieving the top-K tuples that optimize linearly weighted sums of at least some of the attribute values in the subset.

1 Claim, 19 Drawing Sheets

SYSTEM AND METHOD FOR INDEXING A DATA STREAM

This invention was made with Government support under Contract No.: H98230-05-3-0001 awarded by the U.S. Department of Defense. The Government has certain rights in this invention.

BACKGROUND

1. Technical Field

The present invention relates generally to data stream applications and, more particularly, a system and method for indexing data streams.

2. Description of the Related Art

Data stream applications are becoming increasingly popular. Many data stream applications use various linear optimization queries to retrieve the top-K tuples that maximize or minimize the linearly weighted sums of certain attribute values.

For example, in environmental epidemiological applications, linear models that incorporate, e.g., remotely sensed images, weather information, and demographic information are used to predict the outbreak of certain environmental epidemic diseases such as, e.g., Hantavirus Pulmonary Syndrome. In oil/gas exploration applications, linear models that incorporate, e.g., drill sensor measurements and seismic information are used to guide the drilling direction. In financial applications, linear models that incorporate, e.g., personal credit history, income level, and employment history are used to evaluate individual credit risks for loan approvals.

In all the above applications, data continuously streams in (e.g., from satellites and sensors) at a rapid rate. Users frequently pose linear optimization queries and want answers back as soon as possible. Moreover, different individuals may pose queries that have divergent weights and K's. This is because, e.g., the "optimal" weights may vary from one location to another (in oil/gas exploration), the weights may be adjusted as the model is continually trained with historical data collected more recently (in environmental epidemiology and finance), and different users may have differing preferences.

Chang et al., in "The Onion Technique: Indexing for Linear Optimization Queries", SIGMOD Conf. 2000, pp. 391-402 (hereinafter the "Onion Technique Article"), the disclosure of which is incorporated by reference herein, proposed using an onion index to speed up the evaluation of linear optimization queries against a large database relation. An onion index organizes all tuples in the database relation into one or more convex layers, where each convex layer is a convex hull. For each $i \geq 1$, the $(i+1)^{th}$ convex layer is included within the ith convex layer. For any linear optimization query, to find the top-K tuples, typically no more than all the vertices of the first K outer convex layers in the onion index are searched.

However, due to the extremely high cost of computing precise convex hulls, both the creation and the maintenance of the onion index are rather expensive. Moreover, an onion index keeps track of all tuples in a relation and, thus, requires a lot of storage space. In a data streaming environment, tuples keep arriving rapidly while available memory is limited. As a result, it is very difficult to maintain a precise onion index for a data stream, let alone using the precise onion index to provide exact answers to linear optimization queries against the stream.

A description will now be given of the traditional onion index, as disclosed in the above-referenced "Onion Technique Article", for linear optimization queries against a large database relation.

Suppose each tuple includes $n \geq 1$ numerical feature attributes and $m \geq 0$ other non-feature attributes. A top-K linear optimization query asks for the top-K tuples that maximize the following linear equation:

$$\max_{top\ K}\left\{\sum_{i=1}^{n} w_i a_i^j\right\},$$

where $(a_1^j, a_2^j, \ldots, a_n^j)$ is the feature attribute vector of the jth tuple and $(w_1, w_2, \ldots, w_n)$ is the weighting vector of the query. Some $w_i$'s may be zero. Here, $$v_j = \sum_{i=1}^{n} w_i a_i^j$$

is called the linear combination value of the jth tuple. It is to be noted that a linear optimization query may alternatively ask for the K minimal linear combination values. In this case, we can turn such a query into a maximization query by switching the signs of the weights. For purposes of brevity and illustration, maximization queries are primarily described herein after.

A set of tuples S can be mapped to a set of points in an n-dimensional space according to their feature attribute vectors. For a top-K linear optimization query, the top-K tuples are those K tuples with the largest projection values along the query direction.

Linear programming theory has the following theorem, designated herein as Theorem 1.

Theorem 1: Given a linear maximization criterion and a set of tuples S, the maximum linear combination value is achieved at one or more vertices of the convex hull of S.

Utilizing this property, the onion index in the above-referenced "Onion Technique Article" organizes all tuples into one or more convex layers. The first convex layer $L_1$ is the convex hull of all tuples in S. The vertices of $L_1$ form a set $S_1 \subseteq S$. For each i>1, the ith convex layer $L_i$ is the convex hull of all tuples in $$S - \bigcup_{j=1}^{i-1} S_j.$$

The vertices of $L_i$ form a set $$S_i \subseteq S - \bigcup_{j=1}^{i-1} S_j.$$

It is easy to see that for each $i \geq 1$, $L_{i+1}$ is contained within $L_i$. FIG. 1 illustrates an exemplary onion index 100 in two-dimensional space, in accordance with the prior art. The exemplary onion index 100 shown in FIG. 1 includes a first convex layer 110, a second convex layer 120, and a third convex layer 130.

From Theorem 1, we know that the maximum linear combination value at each $L_i$ ($i \geq 1$) is larger than all linear combination values from $L_i$'s inner layers. Also, there may be multiple tuples on $L_i$ whose linear combination values are larger than the maximum linear combination value of $L_{i+1}$. As a result, we have the following property, designated herein as Property 1.

Property 1: For any linear optimization query, suppose all tuples are sorted in descending order of their linear combination values ($v_j$). The tuple that is ranked kth in the sorted list is called the kth largest tuple. Then the largest tuple is on $L_1$. The second largest tuple is on either $L_1$ or $L_2$. In general, for any $i \geq 1$, the ith largest tuple is on one of the first i outer convex layers.

Given a top-K linear optimization query, the search procedure of the onion index starts from $L_1$ and searches the convex layers one by one. On each convex layer, all its vertices are checked. Based on Property 1, the search procedure can find the top-K tuples by searching no more than the first K outer convex layers.

During a tuple insertion or deletion, one or more convex layers may need to be reconstructed in order to maintain the onion index. The detailed onion index maintenance procedure is disclosed in the above-referenced "Onion Technique Article". Both the creation and the maintenance of the onion index require computing convex hulls. This is fairly expensive, as given N points in an n-dimensional space, the worst-case computational complexity of constructing the convex hull is $O(N \ln N + N^{\lfloor n/2 \rfloor})$.

It is to be noted that in some data stream applications, the linear optimization queries are known in advance and the entire history of the stream is considered. In this case, for each linear optimization query, an in-memory materialized view can be maintained to continuously keep track of the top-K tuples. However, if there are many such linear optimization queries, it may not be feasible and/or otherwise possible to keep all these materialized views in memory and/or to maintain them in real time.

It is to be further noted that in a data streaming environment, tuples may continuously arrive rapidly and the available memory is typically limited. To meet the real-time requirement of data streams, everything is preferably done in memory. Moreover, it should not incur a lot of computation or storage overhead. However, the original onion index keeps track of all tuples and, thus, requires a lot of storage space. Also, as noted above, maintaining the original onion index is computationally expensive, making it difficult to meet the real-time requirement of data streams. Therefore, the original onion index, as introduced in the above-referenced "Onion Technique Article" does not work for data streams.

SUMMARY

These and other drawbacks and disadvantages of the prior art are addressed by the present principles, which are directed to a system and method for indexing a data stream.

According to an aspect of the present invention, there is provided a method for indexing a data stream having attribute values. The method includes the steps of parsing the data stream and forming an index of tuples for a subset of attribute values of the data stream. The index is configured for retrieving the top-K tuples that optimize linearly weighted sums of at least some of the attribute values in the subset.

According to another aspect of the present invention, there is provided a computer program product comprising a computer usable medium having computer usable program code for indexing a data stream having attribute values. The computer program product includes computer usable program code for forming an index of tuples for a subset of attribute values of the data stream. The index is configured for retrieving the top-K tuples that optimize linearly weighted sums of at least some of the attribute values in the subset.

According to yet another aspect of the present invention, there is provided a system for indexing a data stream having attribute values. The system includes a data stream indexer for forming an index of tuples for a subset of attribute values of the data stream. The index is configured for retrieving the top-K tuples that optimize linearly weighted sums of at least some of the attribute values in the subset.

These and other objects, features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
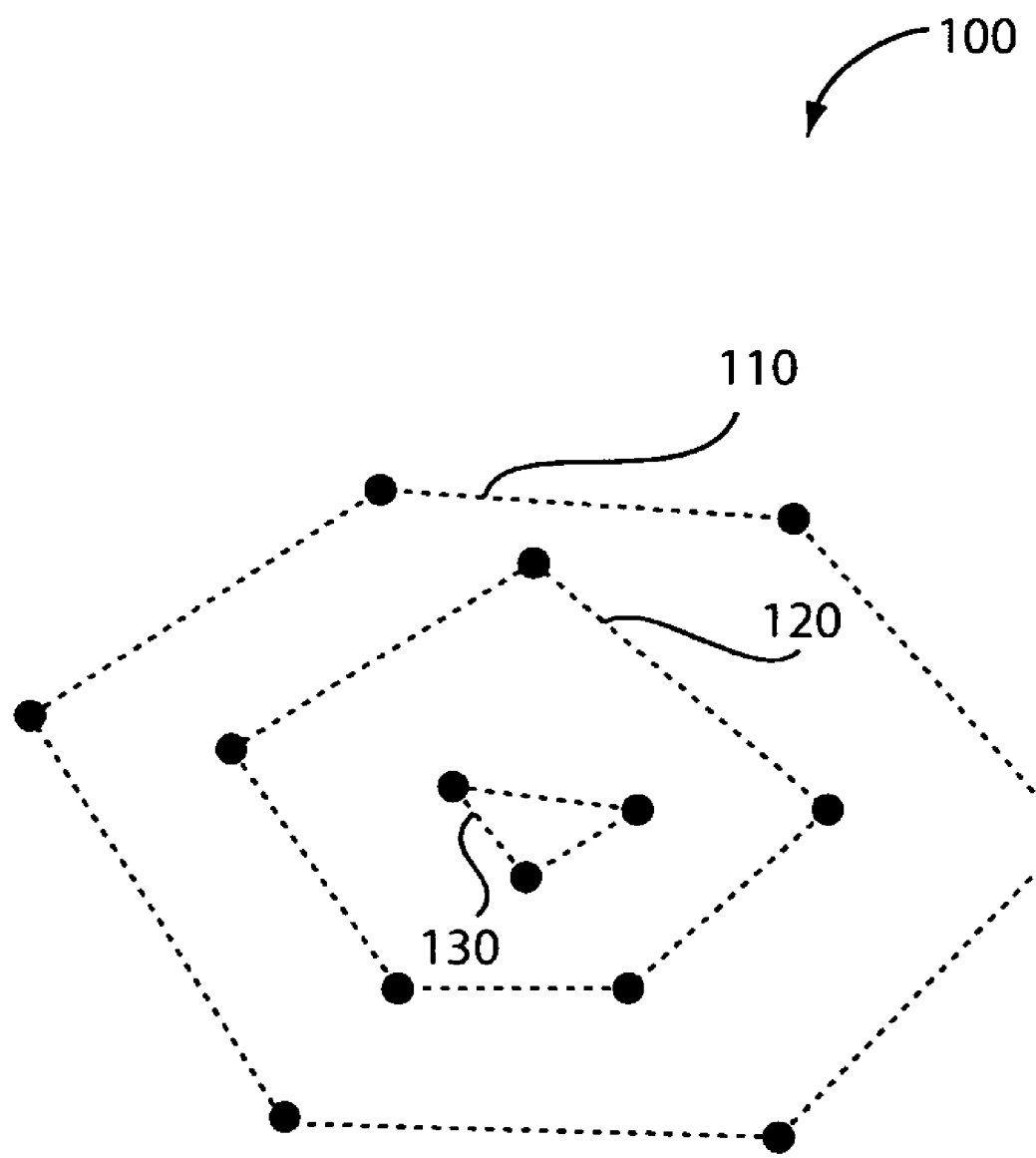
FIG. 1 is a diagram illustrating an onion index 100 in two-dimensional space, in accordance with the prior art.

Embodiments of the present principles are directed to systems and methods for indexing a data stream.

For purposes of brevity and illustration, embodiments of the present principles are described herein with respect to the use of maximization queries for indexing the data streams. However, it is to be appreciated that, given the teachings of the present principles provided herein, embodiments of the present principles may be readily employed for both maximization and minimization queries, as well as other data stream applications, while maintaining the scope of the present invention. Accordingly, the phrase "optimizing" as used herein, shall refer to both maximizing and/or minimizing linearly weighted sums of attributes with respect to an optimization query.

It should be understood that the elements shown in the FIGURES may be implemented in various forms of hardware, software or combinations thereof. Preferably, these elements are implemented in software on one or more appropriately programmed general-purpose digital computers having a processor and memory and input/output interfaces.

Embodiments of the present invention can take the form of an entirely hardware embodiment, an entirely software embodiment or an embodiment including both hardware and software elements. In a preferred embodiment, the present invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that may include, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 2:
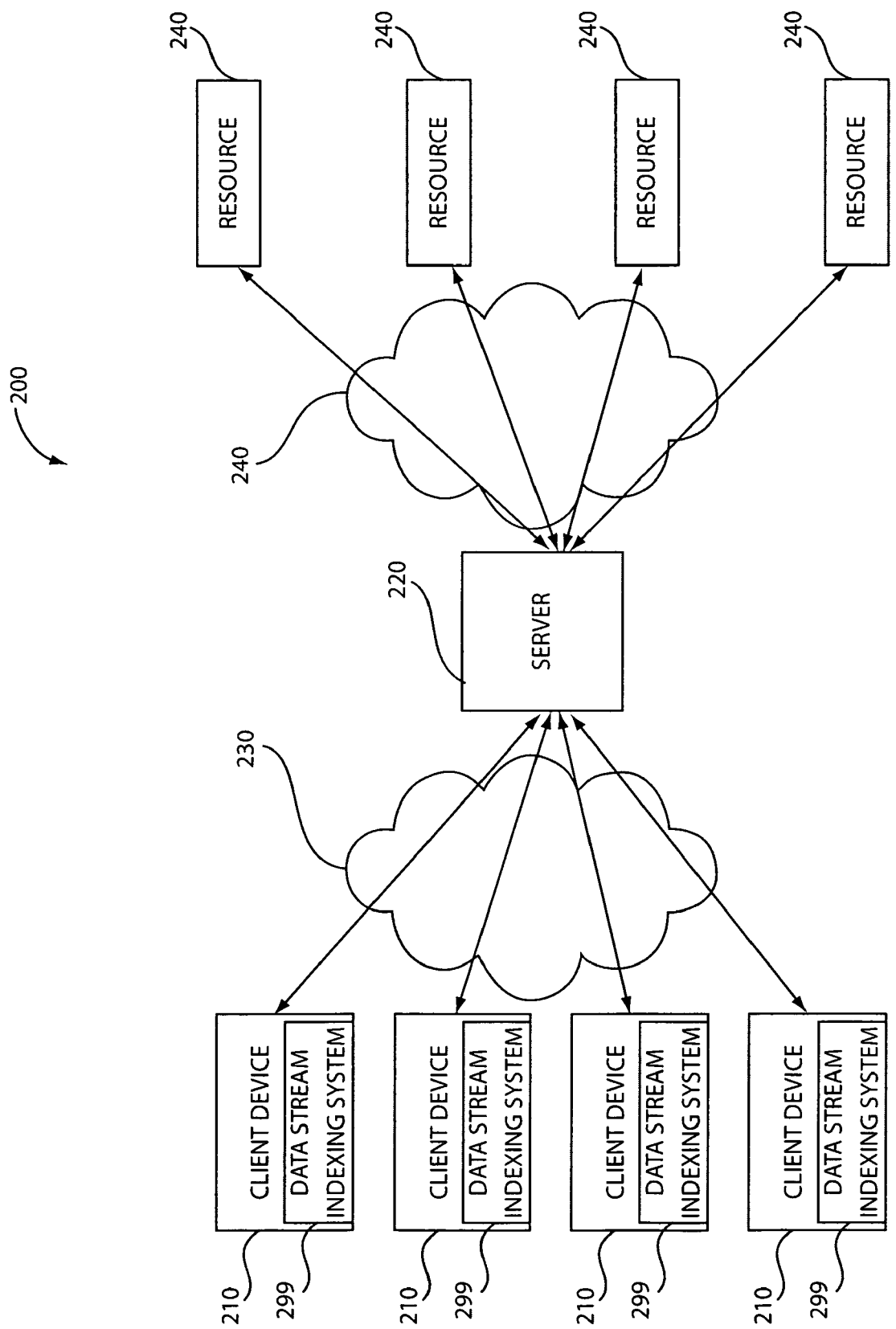
FIG. 2 is a block diagram illustrating an exemplary networked environment to which the present principles may be applied, according to an embodiment thereof.

Referring now to the drawings in which like numerals represent the same or similar elements and initially to FIG. 2, an exemplary networked environment to which the present principles may be applied, is indicated generally by the reference numeral 200. The environment 200 includes one or more client devices 210 connected to a server 220 via a network 230. The network 230 may include wired and/or wireless links. The server 220 may be connected in signal communication with one or more resources 240. The resources 240 may include one or more local and/or remote sources. The resources 240 may be connected to the server 220 directly and/or via, e.g., one or more networks 240 (including wired and/or wireless links). Each of the client devices 210 may include a stream indexing system 299 for creating SAO indexes as described herein.

Figure 3:
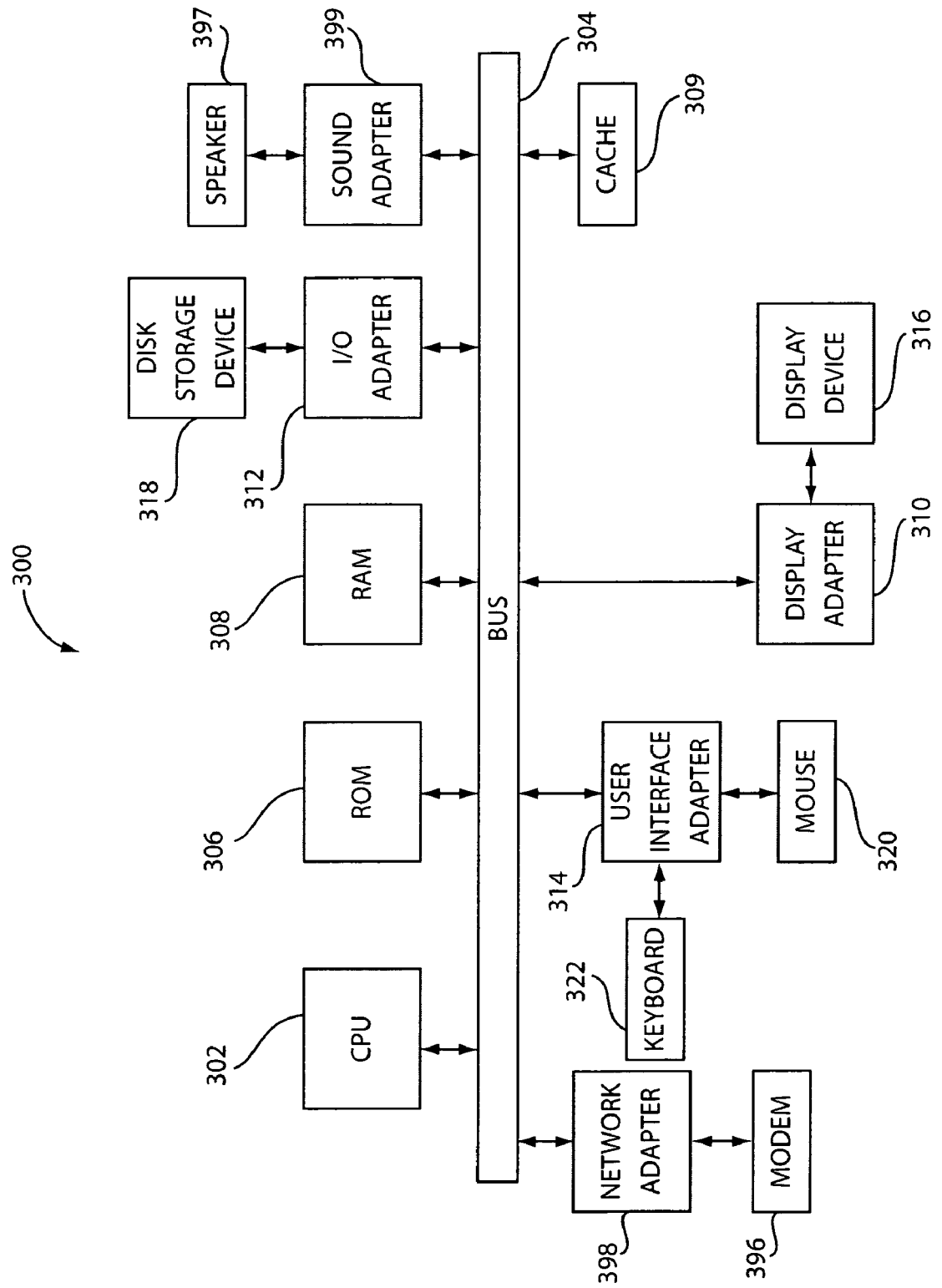
FIG. 3 is a block diagram illustrating an exemplary computing device to which the present principles may be applied, according to an embodiment thereof.

Turning to FIG. 3, an exemplary computing device to which the present principles may be applied is indicated generally by the reference numeral 300. It is to be appreciated that elements of the computing device 300 may be employed in any of the client devices 210, the server 220, and/or the resources 240. Moreover, it is to be further appreciated that elements of the computing device 300 may be employed in the stream indexing system 299.

The computing device 100 includes at least one processor (CPU) 102 operatively coupled to other components via a system bus 104. A read only memory (ROM) 106, a random access memory (RAM) 108, a display adapter 110, an I/O adapter 112, a user interface adapter 114, a sound adapter 199, and a network adapter 198, are operatively coupled to the system bus 104.

A display device 116 is operatively coupled to system bus 104 by display adapter 110. A disk storage device (e.g., a magnetic or optical disk storage device) 118 is operatively coupled to system bus 104 by I/O adapter 112.

A mouse 120 and keyboard 122 are operatively coupled to system bus 104 by user interface adapter 114. The mouse 120 and keyboard 122 are used to input and output information to and from system 100.

At least one speaker (herein after "speaker") 197 is operatively coupled to system bus 104 by sound adapter 199. A (digital and/or analog) modem 196 is operatively coupled to system bus 104 by network adapter 198.

Advantageously, a Stream Approximate Onion-like structure (SAO) index having a plurality of convex layers and corresponding vertices is disclosed herein. The SAO index may be used to provide approximate answers to arbitrary linear optimization queries almost instantaneously. In contrast to the Onion index of the prior art, embodiments of an SAO index in accordance with the present principles may maintain only the first few outer convex layers. Moreover, in contrast to the Onion index of the prior art, embodiments of an SAO index in accordance with the present principles may keep only some of the most "important" vertices in each layer in the SAO index rather than all vertices.

In some embodiments of the present principles, a dynamic, non-uniform storage allocation strategy is used, such that a larger portion of available memory tends to be allocated to the outer layers than to the inner layers. In this way, both storage and maintenance overheads of the SAO index are greatly reduced with respect to the Onion index of the prior art. Additionally, the errors introduced into the approximate answers are also minimized.

The SAO index reduces both the index storage overhead and the index maintenance overhead in relation to the Onion index of the prior art, by keeping only a subset of the tuples in a data stream in the SAO index. In an embodiment, a count-based sliding window model is used for data streams, with W denoting the sliding window size. That is, the tuples under consideration are the last W tuples that have been viewed. Given the teachings of the present invention provided herein, one of ordinary skill in this and related arts may readily extend an SAO index to the case of time-based sliding windows or the case that the entire history of the stream is considered, while maintaining the scope of the present invention.

Suppose the available memory can hold M+1 tuples. In the steady state, no more than M tuples are kept in the SAO index. That is, the storage budget is M tuples. However, in a transition period, M+1 tuples can be kept in the SAO index temporarily. In general, a tuple includes both feature attributes and non-feature attributes. Even if the convex hull data structures for feature attribute vectors occupy a small amount of storage space, the non-feature attributes may still dominate the storage requirement. For example, in the environmental epidemiology application mentioned in the introduction, each tuple has a large non-feature image attribute. For linear optimization queries, we are interested in finding all attributes of the top-K tuples. Hence, the exact value of M depends on the specific application. Given the teachings of the present principles provided herein, the present principles can be readily extended with some modification, to the case where the available memory is measured in terms of bytes.

The SAO index carefully controls the number of tuples on each layer to provide good approximate answers to linear optimization queries. To fully utilize available memory as much as possible, embodiments of the SAO index may dynamically allocate the proper amount of storage to individual layers, as described in detail herein below, so that a larger portion of the available memory tends to be allocated to the outer layers. In this way, the quality of the approximate answers can be maximized without increasing the memory requirement. In the case of memory overflow, embodiments of an SAO index in accordance with the present principles may keep the most "important" tuples and discard the less "important" ones. Moreover, to minimize the computation overhead, embodiments of an SAO index in accordance with the present principles may utilize optimized creation and maintenance algorithms.

A description will now be given regarding an Impossibility Theorem with respect to linear optimization queries and embodiments of an SAO index in accordance with the present principles.

Users submitting linear optimization queries against data streams generally have to accept approximate answers. If $W \leq M$, all W tuples in the sliding window can be kept in memory. Then for any linear optimization query, the exact answer can always be computed by checking the last W tuples. However, if W>M, which is common in practice, it is impossible to keep the last W tuples in memory. Then, according to the following theorem, for any linear optimization query, the return of exact answers cannot always be guaranteed. Hence, users have to accept approximate answers.

Theorem 2: In the case that W>M, for any top-K linear optimization query, no algorithm exists such that for any data distribution, the exact top-K tuples can always be found by just using the M tuples in memory.

Proof: We focus on the one-dimensional case (n=1) with K=1. The proof can be easily extended to the general case where $n \geq 1$ and $K \geq 1$. Consider a linear optimization query whose weight $w_1 > 0$ (the case that $w_1 < 0$ is symmetric). Suppose all tuples arrive in such an order that their feature attribute values ($a_1^j$) are monotonically decreasing. Then it is easy to see that as the sliding window moves, no algorithm can always use the M tuples in memory to keep track of the tuple that is both "valid" and has the largest feature attribute value. That is, we cannot always use the M tuples in memory to find the exact top-1 tuple.

Hereinafter, for purposes of illustration and brevity, the case of W>M is described. In this case, it is impossible to keep the precise onion index in memory and use the precise onion index to provide exact answers to linear optimization queries. Rather, the SAO index is provided, which can provide approximate answers to linear optimization queries almost instantaneously.

An embodiment of an SAO index in accordance with the present principles may employ the following index organization.

One consideration in implementing the SAO index is based on the following observation: An onion index typically includes a large number of convex layers, but most inner layers are not needed for answering the majority of linear optimization queries. For example, as mentioned in above with respect to the onion index, to answer a top-K linear optimization query, at most the first K outer convex layers have to be searched. In contrast, embodiments of an SAO index in accordance with the present principles may keep only the first few outer convex layers rather than all convex layers. More specifically, in an embodiment of an SAO index in accordance with the present principles, a user who creates the SAO index may specify a number L. In such embodiment of the present principles, the SAO index keeps only the first L outer convex layers.

Intuitively, if most linear optimization queries use a large K (e.g., 20), L could be smaller than that K (e.g., L=10). However, if most linear optimization queries use a very small K (e.g., 1), L should be a little larger than that K (e.g., L=2). The reason is as follows. As will be described below with respect to allocating a proper amount of memory to each layer, when K is very small, embodiments of the SAO index may include a few backup convex layers. This is to prevent the undesirable situation that a few tuples on the first K outer convex layers expire and then large errors are introduced into the approximate answers to some linear optimization queries. On the other hand, when K is large, for a top-K linear optimization query, it is likely that the top-K tuples can be found on the first J outer convex layers, where J<K. In this case, if a few tuples on these J convex layers expire, the other convex layers can serve as backups automatically. Hence, L does not need to be larger than K.

Since M is limited, in some circumstances, the SAO index may not keep the precise first L outer convex layers. For example, in the worst case, all W tuples in the sliding window may reside on the first convex layer rather than spread over multiple convex layers. Therefore, for each of the first L outer convex layers, the SAO index may only be able to keep some of the most "important" tuples rather than all the tuples belonging to that layer. In other words, in some embodiments of the SAO index, each layer in the SAO index is an approximate convex layer in the sense that it is an approximation to the corresponding precise convex layer in the onion index. For each i ($1 \leq i \leq L$), $L_i$ is used to denote the ith approximate convex layer.

Embodiments of the SAO index may maintain the following properties. Each approximate convex layer is the convex hull of all tuples on that layer. For each i ($1 \leq i \leq L-1$), $L_{i+1}$ is contained within $L_i$. Also, the total number of tuples on all L approximate convex layers is no more than M. Recall that as mentioned above, in a transition period of some embodiments, M+1 tuples may be kept in the SAO index temporarily.

In an embodiment, all the tuples in the SAO index may be kept as a sorted doubly-linked list $L_{dl}$. The sorting criterion may be a tuple's remaining lifetime. Accordingly, the first tuple in $L_{dl}$ is going to expire the soonest. In this way, we can quickly check whether any tuple in the SAO index expires, which may be utilized for index maintenance as described further below. Also, we can easily delete tuples that are in the middle of $L_{dl}$, which may be done when the available memory is exhausted and a tuple needs to be deleted from the SAO index. Corresponding considerations are further described below with respect to dynamic, non-uniform storage allocation.

For each approximate convex layer, a standard convex hull data structure may be maintained. The vertices of the convex hull point to tuples in $L_{dl}$. Also, each tuple t in $L_{dl}$ may have a label indicating the approximate convex layer to which tuple t belongs. This label may be used when a tuple expires and the tuple needs to be removed from the corresponding approximate convex layer. Corresponding considerations are further described below with respect to SAO index maintenance.

Embodiments of an SAO index in accordance with the present principles may employ various techniques for allocating the proper amount of memory to each layer. Some of these various techniques will now be described.

It is to be appreciated that a consideration in implementing an SAO index in accordance with the present principles is the approach to be taken to properly allocate memory to each layer, given a finite amount of memory, so that the quality of the approximate answers can be maximized. Accordingly, examples of why memory allocation should be used are provided, followed by three exemplary allocation strategies, namely: a simple, uniform strategy; a static, non-uniform strategy; and a dynamic, non-uniform strategy. Of course, given the teachings of the present invention provided herein, one of ordinary skill in this and related arts will contemplate these and various other memory allocation strategies for an SAO index in accordance with the present principles, while maintaining the scope of the present principles.

It is preferable that the SAO index controls the number of tuples on each approximate convex layer. Otherwise, one or a few approximate convex layers may use up all of the storage budget M. As a consequence, the SAO index may not provide good approximate answers to certain linear optimization queries.

Figure 4:
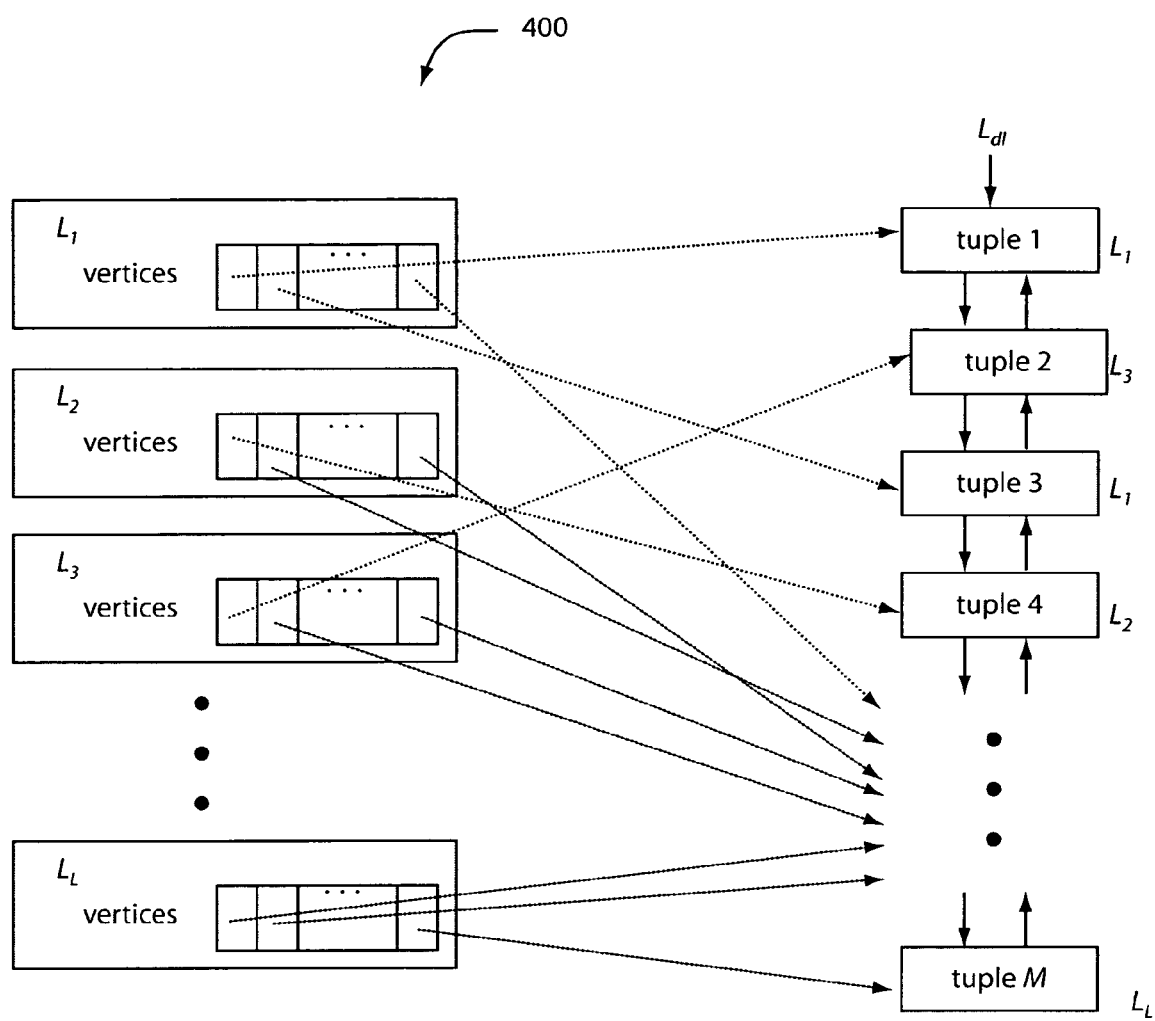
FIG. 4 is a diagram illustrating an exemplary data structure of an SAO index, according to an embodiment of the present principles.
Figure 5A:
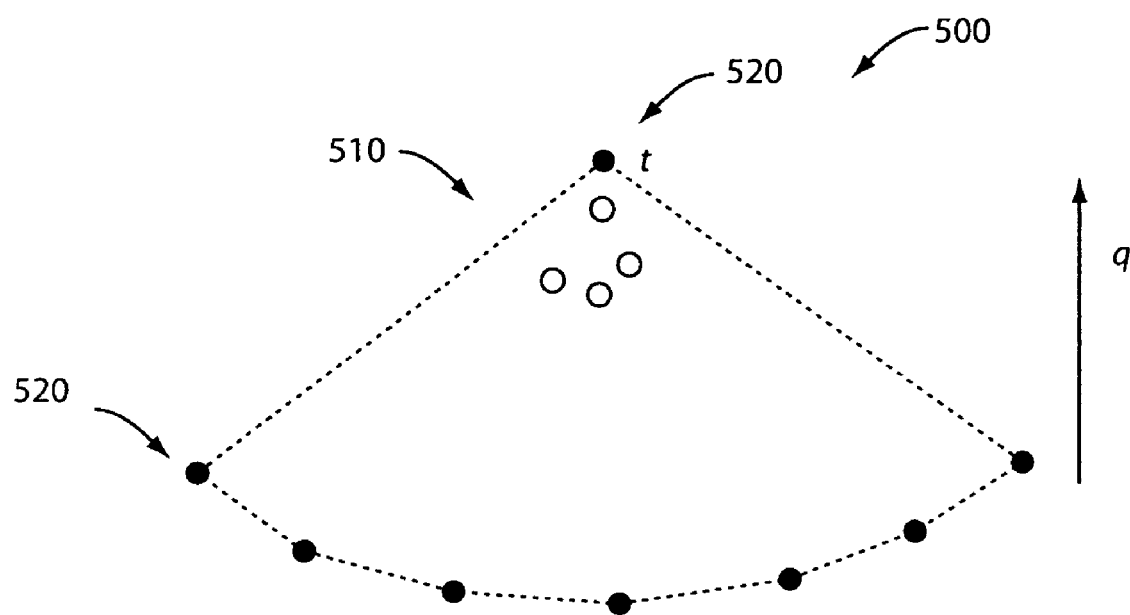
FIGS. 5A and 5B are diagrams illustrating an exemplary SAO index 500 in two-dimensional space with approximate convex layer $L_1$ using up all of the storage budget, according to an embodiment of the present principles.
Figure 5B:
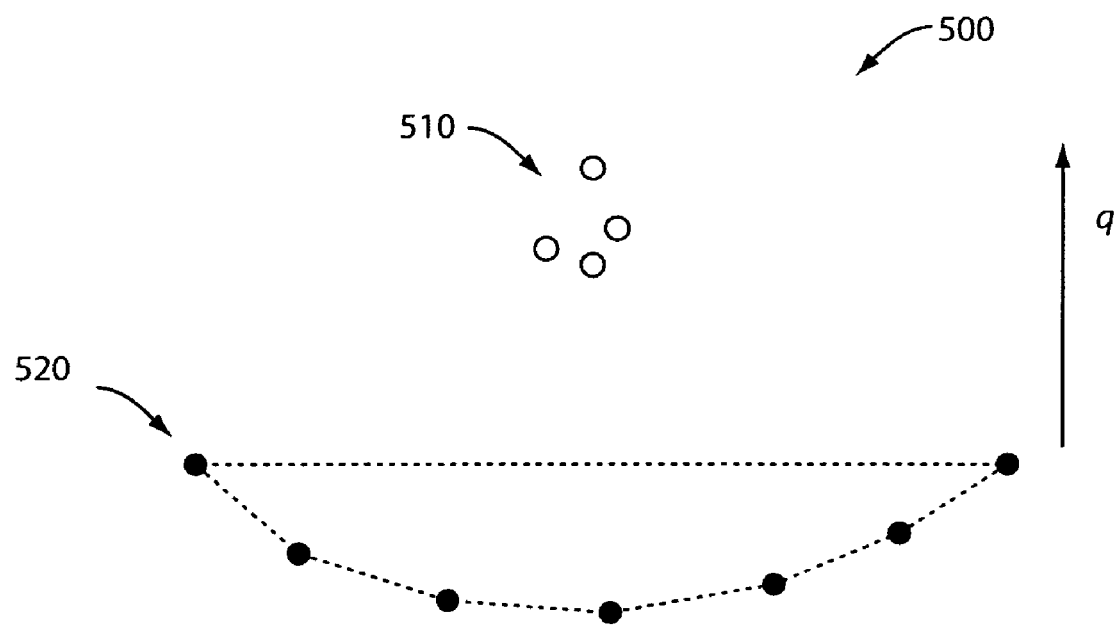

FIG. 4 is a diagram illustrating an exemplary data structure of an SAO index according to the present principles. In FIG. 4, suppose $L_1$, the first approximate convex layer, uses up all of the storage budget M and all the other L−1 approximate convex layers are empty (It is to be noted that the convention shown in the above-referenced "Onion Technique Article" with respect to using dotted polygons to represent approximate convex layers is also used herein). In this case, the information about all tuples inside $L_1$ is lost. These tuples are represented by the hollow circles in FIGS. 5A and 5B and are, thus, called hollow tuples 510. Non-hollow tuples are represented by the filled-in circles 520. FIGS. 5A and 5B are diagrams illustrating an exemplary SAO index 500 in two-dimensional space with approximate convex layer $L_1$ using up all of the storage budget, according to the present principles. In particular, FIG. 5A illustrates an example corresponding to a time before a tuple t expires, and FIG. 5B illustrates an example corresponding to a time after tuple t has expired.

Consider a top-1 linear optimization query q whose direction is represented by the arrow in FIGS. 5A and 5B. When tuple t expires from the sliding window, the SAO index cannot provide good approximate answer to q. This is because the linear combination values of those hollow tuples are all much larger than the maximal linear combination value of the remaining tuples on $L_1$. However, those hollow tuples are not kept in the SAO index.

Figure 6:
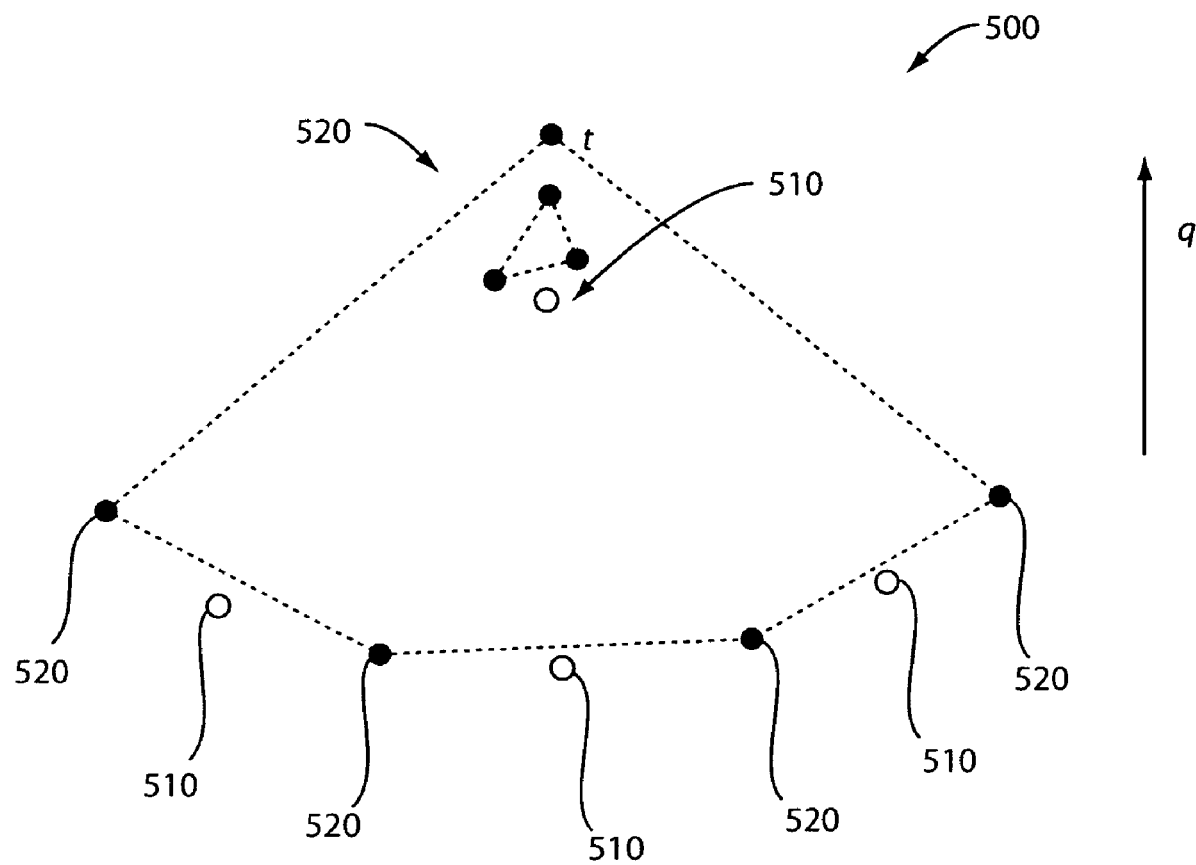
FIG. 6 is a diagram illustrating the exemplary SAO index 500 of FIG. 5 in two-dimensional space with the storage budget divided between two approximate convex layers, according to an embodiment of the present principles.

Now suppose the SAO index controls the number of tuples on each approximate convex layer. For example, the storage budget M is divided among all L approximate convex layers in a more balanced way, as shown in FIG. 6. FIG. 6 is a diagram illustrating the exemplary SAO index 500 of FIG. 5 in two-dimensional space with the storage budget divided between two approximate convex layers in a balanced way, according to the present principles. This has the effect that some of the information contained in $L_1$ is lost while some other information can be kept in the other L−1 approximate convex layers.

Figure 7:
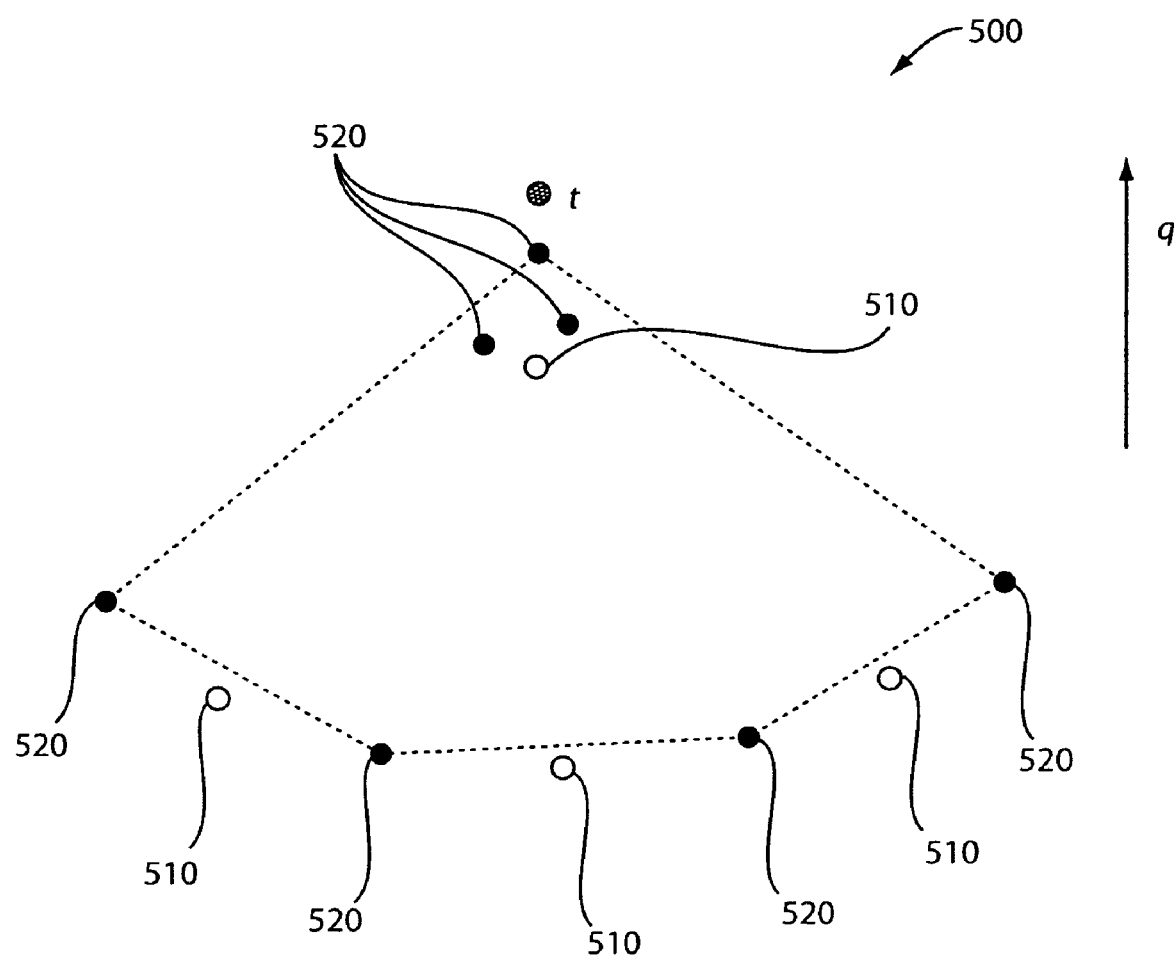
FIG. 7 is a diagram illustrating the exemplary SAO index 500 of FIG. 6 in two-dimensional space after tuple t expires, according to an embodiment of the present principles.

Then after tuple t expires, $L_1$ can be "recovered" by using the information contained in $L_2$ (an exemplary recovery procedure is described herein below with respect to index maintenance), as shown in FIG. 7. FIG. 7 is a diagram illustrating the exemplary SAO index 500 of FIG. 6 (with the storage budget M divided among all L approximate convex layers) in two-dimensional space after tuple t expires, according to the present principles. As a result, the SAO index can still provide a good approximate answer to the linear optimization query q.

Embodiments of an SAO index in accordance with the present principles may utilize a simple, uniform storage allocation strategy.

Figure 8:
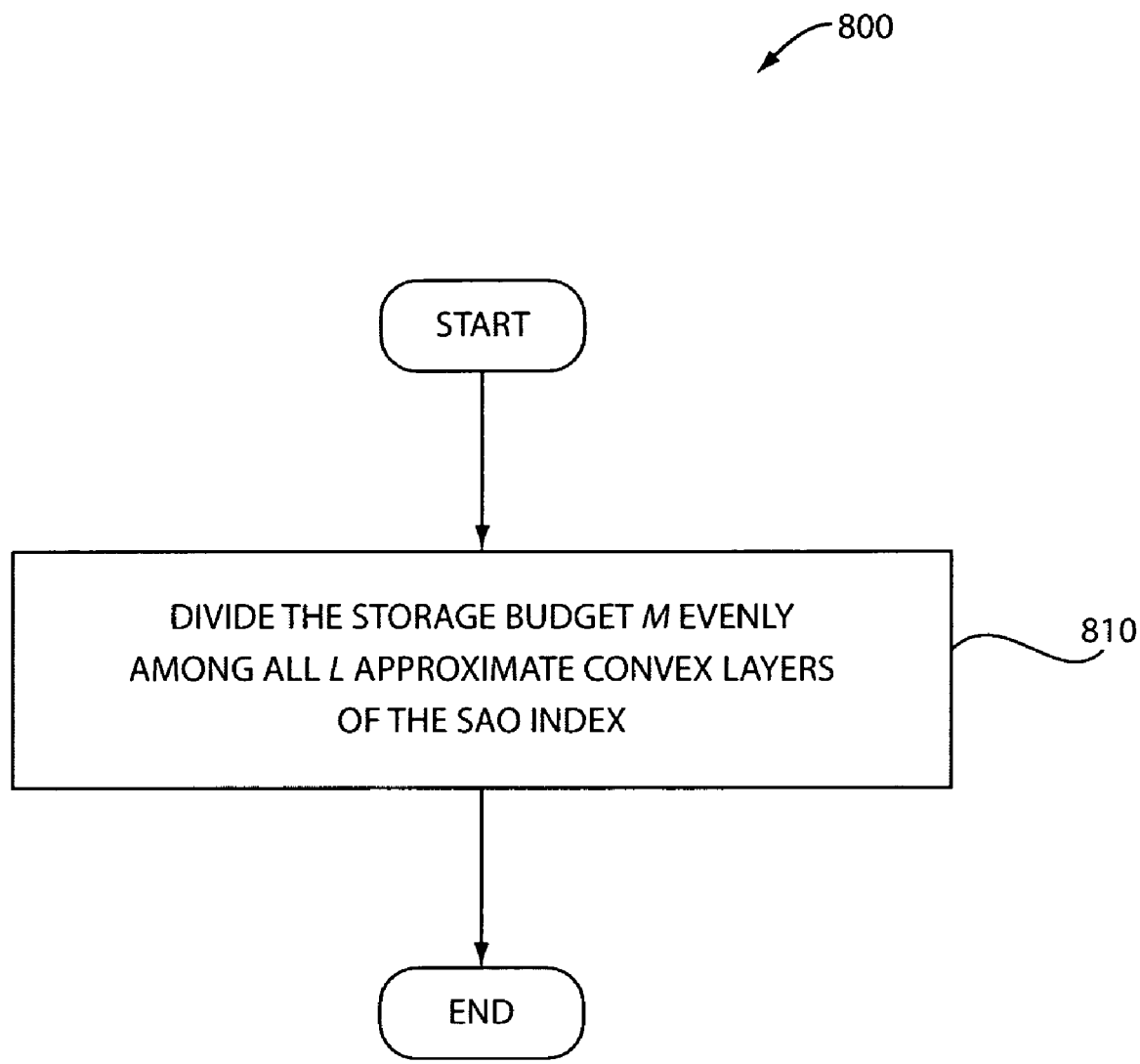
FIG. 8 is a flow diagram illustrating an exemplary method for uniform memory allocation for an SAO index, according to an embodiment of the present principles.

Turning to FIG. 8, an exemplary method for uniform memory allocation for an SAO index is indicated generally by the reference numeral 800.

As shown in FIG. 8, a simple storage allocation strategy in accordance with one embodiment of the present principles is to divide the storage budget M evenly among all L approximate convex layers (step 810). In the embodiment, each approximate convex layer does not keep more than M/L tuples.

However, this simple, uniform method may not always provide an optimal allocation of memory. The reason is as follows. In the precise onion index, according to Property 1, for a linear optimization query, we tend to find more of the top-K tuples on the outer convex layers than on the inner convex layers. For example, consider a top-20 linear optimization query. The precise onion index may find the largest ten tuples on the first convex layer, the next largest six tuples on the second convex layer, and the remaining largest four tuples on the third convex layer. This is consistent with an observation made of the onion index of the above-referenced "Onion Technique Article", namely: to retrieve the top-K tuples, typically we only need to access a few outer convex layers rather than all first K outer convex layers in the precise onion index.

The approximating SAO index is implemented so as to have a similar property with respect to the precise onion index, namely: for a linear optimization query, we tend to find more of the top-K tuples on the outer approximate convex layers than on the inner approximate convex layers. Intuitively, the more tuples allocated to an approximate convex layer $L_i$ ($1 \leq i \leq L$) in the SAO index, the closer $L_i$ is to the corresponding precise convex layer and, thus, the more precise the top tuples we find on $L_i$. Moreover, as discussed below, compared to the top tuples that are found on the inner approximate convex layers, the top tuples that are found on the outer approximate convex layers are ranked higher and, thus, more important. Therefore, to provide good approximate answers to linear optimization queries, the SAO index should allocate more tuples to the outer approximate convex layers than to the inner approximate convex layers.

Embodiments of an SAO index in accordance with the present principles may employ a static, non-uniform storage allocation strategy.

Figure 9:
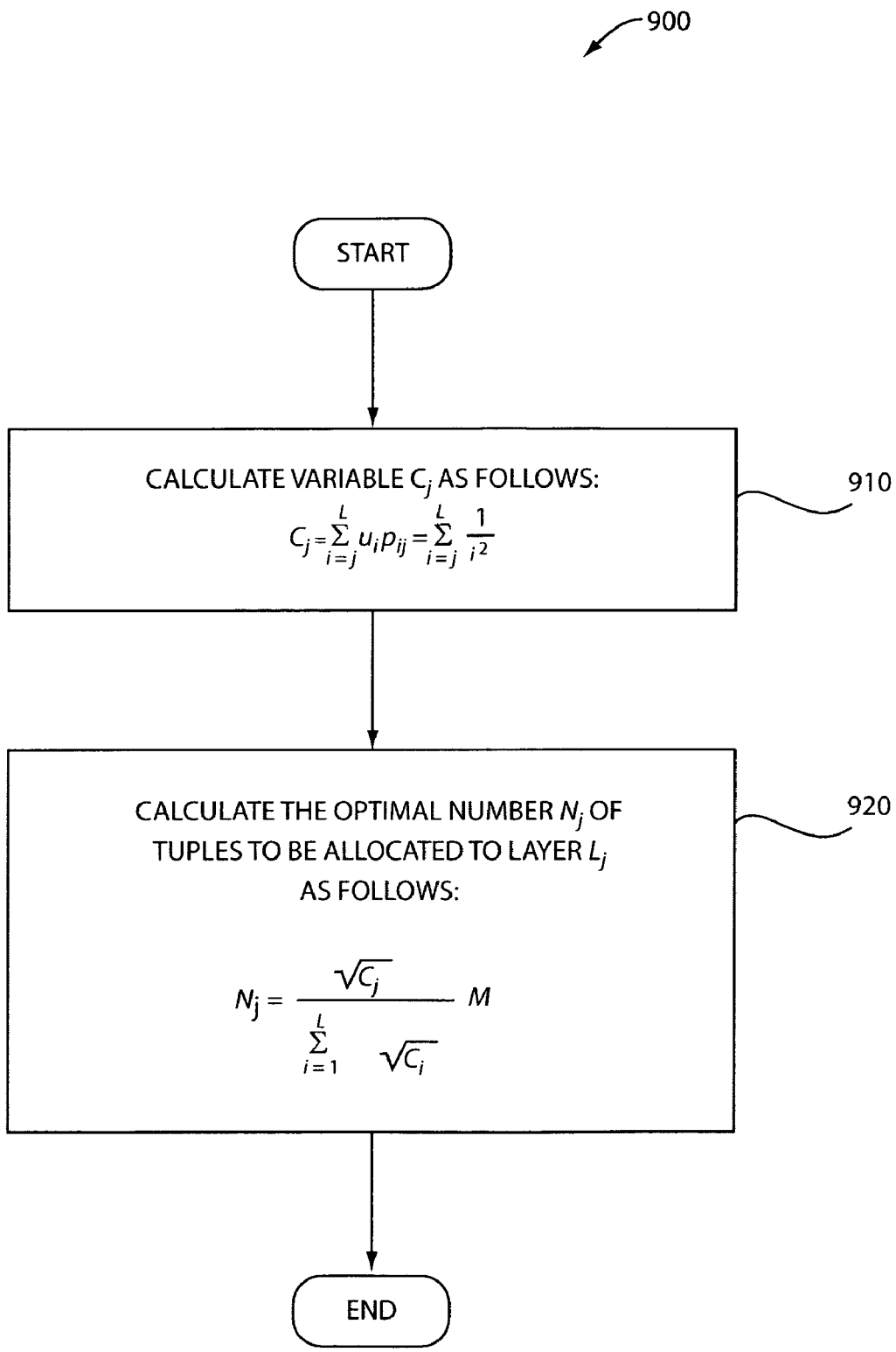
FIG. 9 is a flow diagram illustrating an exemplary method for static, non-uniform memory allocation for an SAO index, according to an embodiment of the present principles.

Turning to FIG. 9, an exemplary method for static, non-uniform memory allocation for an SAO index is indicated generally by the reference numeral 900.

In an embodiment corresponding to the case that resources are limited, we determine the optimal numbers of tuples the SAO index should allocate to the L approximate convex layers. As used herein, the phrase "resources are limited" refers to the condition where each approximate convex layer needs more tuples than can be actually allocated to it. Hereinafter, other embodiments of an SAO index are described that utilize a dynamic, non-uniform storage allocation strategy that is based on the results derived with respect to the static, non-uniform storage allocation strategy.

In the case that resources are limited, for each i ($1 \leq i \leq L$), let $N_i$ denote the optimal number of tuples that should be allocated to $L_i$. Then, $N_i$ is determined as follows:

$$\sum_{i=1}^{L} N_i = M. \quad (1)$$

In general, the values of $N_i$'s depend on the exact data distribution. Since the data distribution is usually not known in advance, $N_i$'s cannot be determined exactly. In our derivation, a few simplified presumptions are made. This makes our derived $N_i$'s heuristic in nature rather than exactly optimal.

Consider a top-L linear optimization query. For each i ($1 \leq i \leq L$), let $t_i$ represent the exact ith largest tuple, and $t_i'$ represent the ith largest tuple that is found in the SAO index. Here, $v_i$ is the linear combination value of $t_i$, and $v_i'$ is the linear combination value of $t_i'$. The relative error of $t_i'$ is defined as follows:

$$e_i = \left| \frac{v_i - v_i'}{v_i} \right|. \quad (2)$$

For the top-L tuples ($t_i'$) that are returned by the SAO index, a weighted mean of their relative errors is used as the performance metric e:

$$e = \frac{\sum_{i=1}^{L} u_i e_i}{\sum_{i=1}^{L} u_i}, \quad (3)$$

where $u_i$ is the weight of $e_i$. Intuitively, the higher the rank of a tuple t, the more important t's relative error. Hence, $u_i$ should be a non-increasing function of i. We would like to minimize the mean of e for all top-L linear optimization queries. This is the condition based on which $N_i$'s are derived.

Let $p_{ij}$ ($1 \leq i \leq L$, $1 \leq j \leq L$) represent the probability that for a top-L linear optimization query, tuple $t_i$ is on the jth convex layer in the onion index. We assume that in this case, tuple $t_i'$ is also on $L_j$, the jth approximate convex layer in the SAO index. Furthermore, the mean of $e_i$ for all top-L linear optimization queries is $1/N_j$, based on the intuition that the larger the $N_j$, the closer $L_j$ is to the jth precise convex layer in the onion index and, thus, the smaller the $e_i$.

Figure 10:
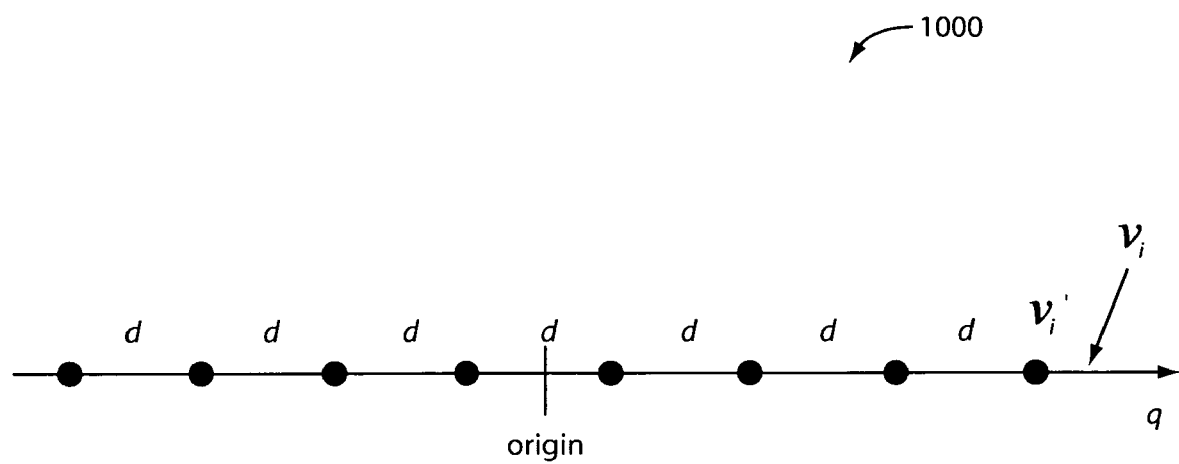
FIG. 10 is a diagram illustrating a projection 1000 of tuples along the direction of query q, according to an embodiment of the present principles.

For illustrative purposes, a heuristic justification for the assumption of $1/N_j$ is provided as follows. We project all $N_j$ tuples on $L_j$ along the query direction, as shown in FIG. 10, which is a diagram illustrating a projection 1000 of tuples along the direction of query q in accordance with an exemplary embodiment of the present principles. Each projection is a point. For these $N_j$ points, let d denote the average distance between two adjacent points. Presume that on average, half of the $N_j$ points are to the left of the origin, and the other half of the $N_j$ points are to the right of the origin. The projection of tuple $t_i'$ is point $v_i'$. We have $E(v_i') = dN_j/2$, where E(x) represents the expectation of x. Note that $v_i$, the projection of tuple $t_i$, is to the right of point $v_i'$. Suppose the average distance between $v_i'$ and $v_i$ is d/2. Then for a specific j, the mean of $e_i$ is as follows:

$$E\left(\left|\frac{v_i - v_i'}{v_i}\right|\right) \approx E\left(\left|\frac{v_i - v_i'}{v_i}\right|\right) \approx \frac{E(|v_i - v_i'|)}{E(|v_i'|)} = \left|\frac{d/2}{dN_j/2}\right| = \frac{1}{N_j}.$$

Now we return to the goal of minimizing $\bar{e}$, the mean of e. For each i ($1 \leq i \leq L$), tuple $t_i$ must be on one of the L convex layers in the onion index. Hence, $\bar{e}_i$, the mean of $e_i$, is a weighted average over all j's ($1 \leq j \leq L$) as follows:

$$\bar{e}_i = \sum_{j=1}^{L} p_{ij} \frac{1}{N_j}.$$

From Equation (3), we have the following:

$$\bar{e} \sum_{i=1}^{L} u_i = \sum_{i=1}^{L} u_i \bar{e}_i = \sum_{i=1}^{L} \left( u_i \sum_{j=1}^{L} p_{ij} \frac{1}{N_j} \right) = \sum_{j=1}^{L} \left( \frac{1}{N_j} \sum_{i=1}^{L} u_i p_{ij} \right).$$

Define $C_j$ as follows:

$$C_j = \sum_{i=1}^{L} u_i p_{ij}. \quad (4)$$

We have the following:

$$\bar{e} \sum_{i=1}^{L} u_i = \sum_{j=1}^{L} \frac{1}{N_j} C_j = \sum_{j=1}^{L} \sqrt{C_j} \frac{\sqrt{C_j}}{N_j}. \quad (5)$$

From Equation (1), we obtain the following:

$$M = \sum_{j=1}^{L} N_j = \sum_{j=1}^{L} \sqrt{C_j} \frac{N_j}{\sqrt{C_j}}. \quad (6)$$

To minimize $\bar{e}$, the following weighted arithmetic-harmonic means inequality is used:

Theorem 3. Given L positive weights $w_1, w_2, \ldots, w_L$ and L positive numbers $x_1, x_2, \ldots, x_L$, we have weighted arithmetic mean $\geq$ 2 weighted harmonic mean, with equality only when $x_1 = x_2 = \ldots = x_L$. That is, $$\frac{\sum_{j=1}^{L} w_j x_j}{\sum_{j=1}^{L} w_j} \geq \frac{\sum_{j=1}^{L} w_j}{\sum_{j=1}^{L} w_j \frac{1}{x_j}}. \tag{7}$$

After transforming (7), we have $$\sum_{j=1}^{L} w_j \frac{1}{x_j} \geq \frac{\left(\sum_{j=1}^{L} w_j\right)^2}{\sum_{j=1}^{L} w_j x_j}. \tag{8}$$

Let $$w_j = \sqrt{C_j} \quad \text{and} \quad x_j = \frac{N_j}{\sqrt{C_j}}.$$

Using Equations (5), (6), and (8), we know that $\bar{e}$ (or alternatively, the left side of Equation (5)) is minimized when the following condition holds:

$$\frac{N_1}{\sqrt{C_1}} = \frac{N_2}{\sqrt{C_2}} = \ldots = \frac{N_L}{\sqrt{C_L}}. \tag{9}$$

Then from Equation (1), we obtain the following:

$$N_j = \frac{\sqrt{C_j}}{\sum_{i=1}^{L} \sqrt{C_i}} M. \tag{10}$$

According to Property 1, we know that if $i < j$, $p_{ij} = 0$. If we assume that $t_i$, the exact ith largest tuple, has equal probability to be on any one of the first i outer convex layers in the onion index, then we have the following:

$$p_{ij} = \begin{cases} 1/i & (i \geq j) \\ 0 & (i < j) \end{cases}.$$

In accordance with the present principles, for illustration purposes, we pick $u_i = 1/i$. It is to be appreciated that other choices of $u_i$ can be used, while maintaining the scope of the present principles. The results are similar and, thus, omitted herein, but are readily determined by one of ordinary skill in this and related arts. Then, from Equation (4), we have the following:

$$C_j = \sum_{i=j}^{L} u_i p_{ij} = \sum_{i=j}^{L} \frac{1}{i^2}.$$

Turning to FIG. 9, an exemplary method for static, non-uniform memory allocation for an SAO index is indicated generally by the reference numeral 900. For purposes of illustration and brevity, the method 900 is described in a cursory manner, having been described in detail herein above.

In determining the optimal number $N_j$ of tuples that should be allocated to layer $L_j$, first a variable $C_j$ is calculated as follows:

$$C_j = \sum_{i=j}^{L} u_i p_{ij} = \sum_{i=j}^{L} \frac{1}{i^2} \quad \text{(step 910)}$$

Then, using the value of $C_j$ calculated at step 910, $N_j$ is calculated as follows:

$$N_j = \frac{\sqrt{C_j}}{\sum_{i=1}^{L} \sqrt{C_i}} M \quad \text{(step 920)}$$

It is to be appreciated that steps 910 and 920 may be performed for each layer of the SAO index. In this way, an optimal memory allocation may be implemented for each layer of the SAO index.

Embodiments of an SAO index in accordance with the present principles may utilize dynamic, non-uniform storage allocation.

In an embodiment, if for each i ($1 \leq i \leq L$), $L_i$, the ith approximate convex layer always needs more than $N_i$ tuples, then the SAO index can use a static storage allocation strategy so that $L_i$ gets a fixed storage quota of $N_i$ tuples. However, real world application may require more of a dynamic response. At any time, some approximate convex layers may need more than $N_i$ tuples while other approximate convex layers may need fewer than $N_i$ tuples. As tuples keep entering and leaving the sliding window, the storage requirements of different approximate convex layers change continuously. If the SAO index sticks with the static storage allocation strategy, the total storage quota of M tuples cannot always be fully utilized. For example, this is the case if some approximate convex layers do not use up their storage quota $N_i$. This will hurt the quality of the approximate answers the SAO index provides to linear optimization queries.

To ensure the best quality of the approximate answers that are provided to linear optimization queries, the SAO index needs to fully utilize the storage budget M as much as possible. Therefore, instead of using the static storage allocation strategy, the SAO index does dynamic storage allocation. In this way, the approximate convex layers that need extra storage quota can "borrow" some quota from those approximate convex layers that have spare quota.

With respect to dynamic, non-uniform storage allocation that may be used by some embodiments of an SAO index in accordance with the present principles, our design principle is that whenever possible, the storage budget M is used up. At the same time, the SAO index maintains condition (9) as much as possible. That is, the number of tuples on $L_i$ is proportional to $\sqrt{C_i}$.

Figure 11:
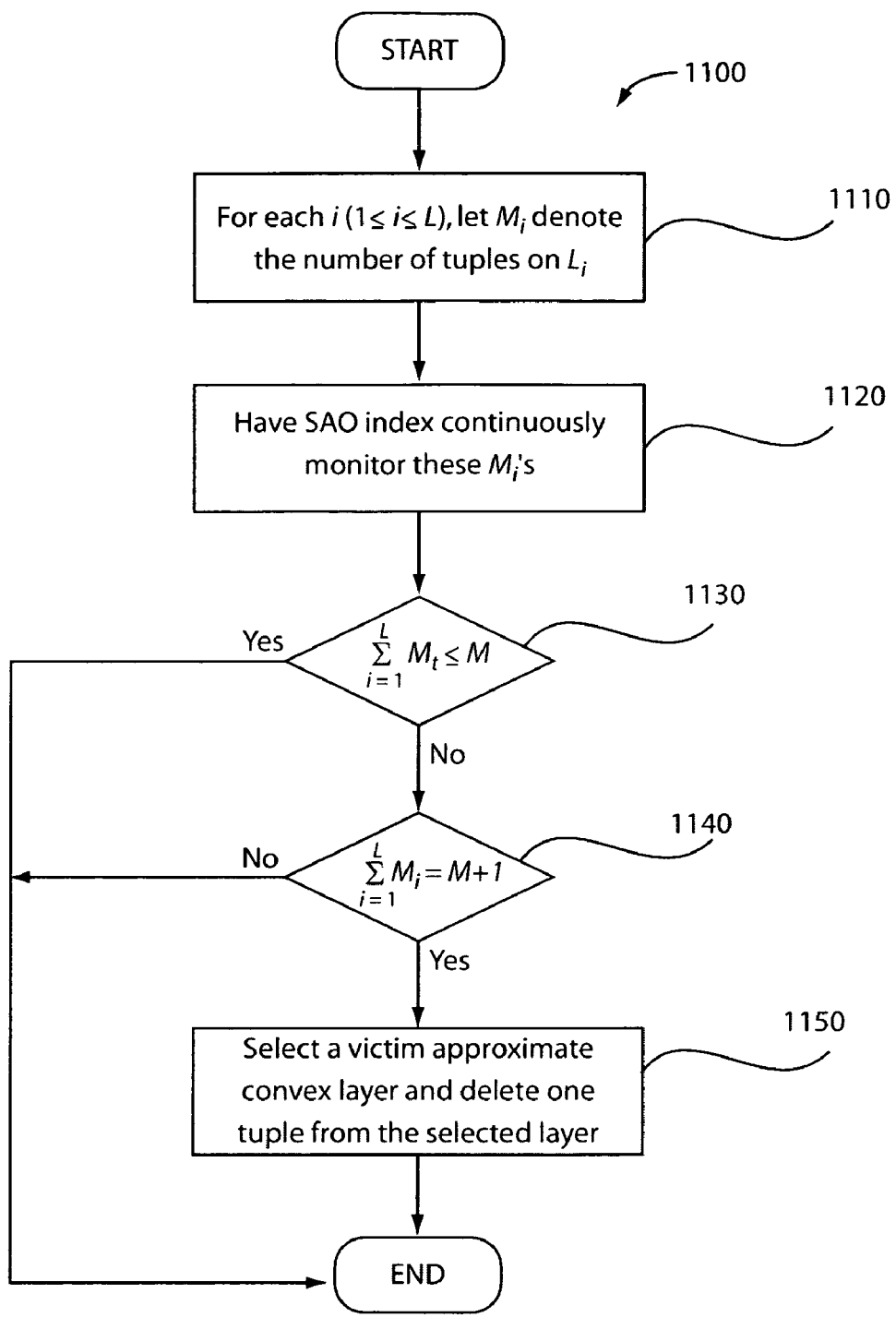
FIG. 11 is a flow diagram illustrating an exemplary method for dynamic, non-uniform storage allocation for an SAO index, according to an embodiment of the present principles.

In accordance with one embodiment, an exemplary method for dynamic, non-uniform storage allocation for an SAO index is indicated generally by the reference numeral 1100 in FIG. 11.

The dynamic, non-uniform storage allocation method 1100 is described as follows. For each i ($1 \leq i \leq L$), let $M_i$ denote the number of tuples on $L_i$ (step 1110). The SAO index continuously monitors these $M_i$'s (step 1120). At any time, there are two possible cases. In the first case, $$\sum_{i=1}^{L} M_i \leq M,$$

which is determined at step 1130. This is the safe case and nothing needs to be done, as the storage budget M has not been used up. In the second case, $$\sum_{i=1}^{L} M_i = M + 1,$$

which is determined at step 1140. According to our SAO index maintenance strategy that is described herein below, $$\sum_{i=1}^{L} M_i$$

can never be larger than M+1. This is the unsafe case, as the storage budget M is exceeded by one. Thus, a victim approximate convex layer has to be selected and one tuple has to be deleted from the selected layer (step 1150).

Note that the dynamic storage allocation strategy is of a fine granularity. Each time memory is exhausted, one tuple is deleted from the SAO index. One may consider whether we could use a dynamic storage allocation strategy that is of a coarser granularity. That is, each time memory is exhausted, multiple tuples (rather than a single tuple) are deleted from the SAO index. Then, it will take longer before memory is exhausted again. However, such a method is not desirable in our environment. This is because our storage budget is precious, as M may be small. We want to fully utilize the limited storage budget as much as possible so that the SAO index can provide the best approximate answers to linear optimization queries. Moreover, as can be seen from the description of step 1 of the exemplary index maintenance described herein below, the insertion of a new tuple into the SAO index may cause multiple tuples to be expelled from $L_L$ and then some storage budget becomes available automatically.

In an embodiment relating to a dynamic, non-uniform storage strategy, a victim approximate convex layer may be chosen as follows. It is to be appreciated that the following methodology is merely illustrative and, given the teachings of the present invention provided herein, one of ordinary skill in this and related arts may contemplate this and other methodologies for choosing a victim approximate convex layer, while maintaining the scope of the present invention.

Figure 12:
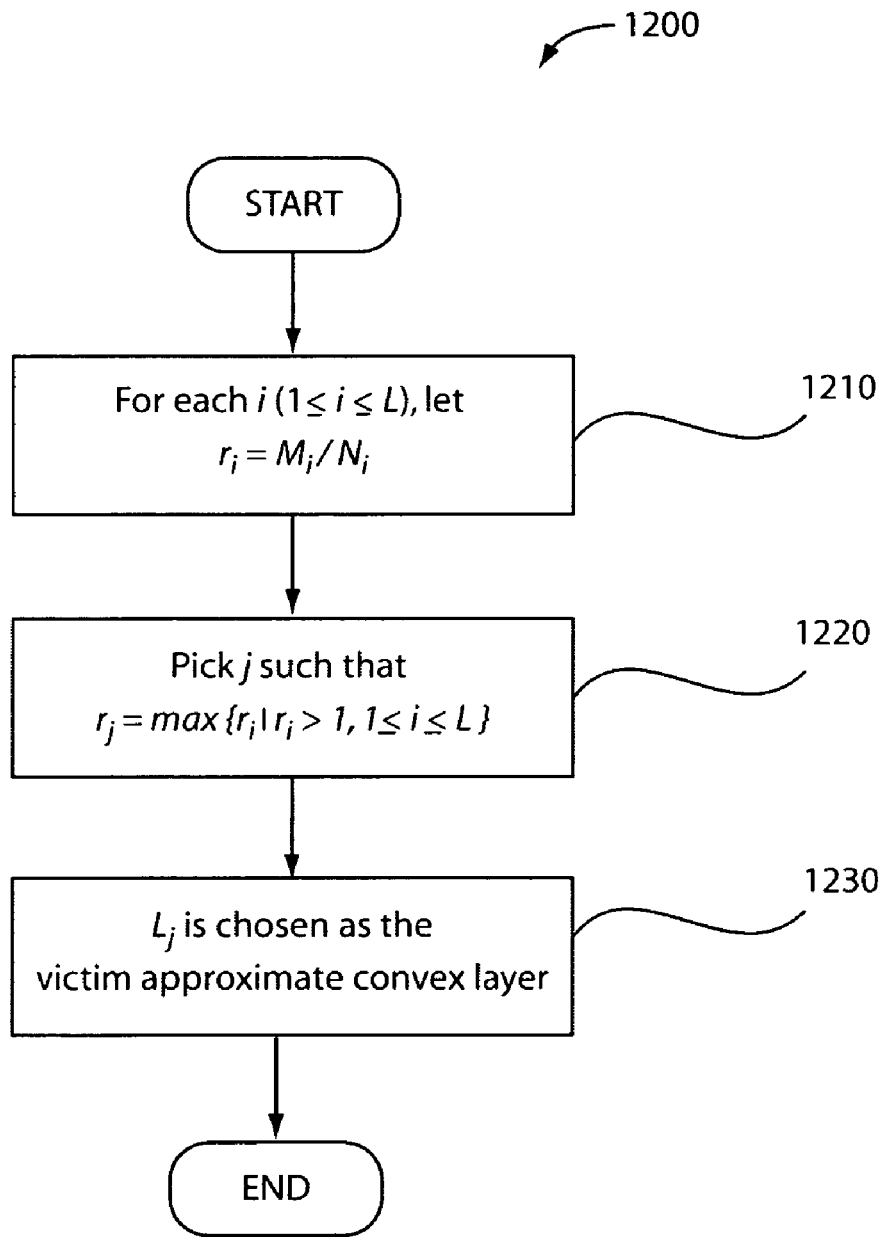
FIG. 12 is a flow diagram illustrating an exemplary method for selecting a victim approximate convex layer with respect to the dynamic, non-uniform storage allocation method 1100 of FIG. 11, according to an embodiment of the present principles.

Turning to FIG. 12, an exemplary method for selecting a victim approximate convex layer with respect to the dynamic, non-uniform storage allocation method 1100 of FIG. 11 is indicated generally by the reference numeral 1200. For each i ($1 \leq i \leq L$), let $r_i = M_i/N_i$ (step 1210). We pick j such that $r_j = \max\{r_i | r_i > 1, 1 \leq i \leq L\}$ (step 1220). This j must exist. Otherwise for each i ($1 \leq i \leq L$), $r_i \leq 1$. This leads to $$\sum_{i=1}^{L} M_i \leq \sum_{i=1}^{L} N_i = M,$$

which conflicts with the condition that $$\sum_{i=1}^{L} M_i = M + 1.$$

$L_j$ is chosen as the victim approximate convex layer (step 1230).

The above method is based on the intuition that the victim approximate convex layer $L_j$ should satisfy the following two conditions. First, $L_j$ has used up its fixed quota $N_j$. Second, among all approximate convex layers that have used up their fixed quota $N_i$, $L_j$ exceeds its fixed quota (by the ratio $r_j$) the most. In this way, we can be fair to those approximate convex layers that have not used up their fixed quota $N_i$. Also, the SAO index can maintain the condition $M_i \propto \sqrt{C_i}$ as much as possible.

In an embodiment relating to a dynamic, non-uniform storage strategy, a victim tuple may be chosen as follows. It is to be appreciated that the following methodology is merely illustrative and, given the teachings of the present invention provided herein, one of ordinary skill in this and related arts may contemplate this and other methodologies for choosing a victim tuple, while maintaining the scope of the present invention.

Figure 13:
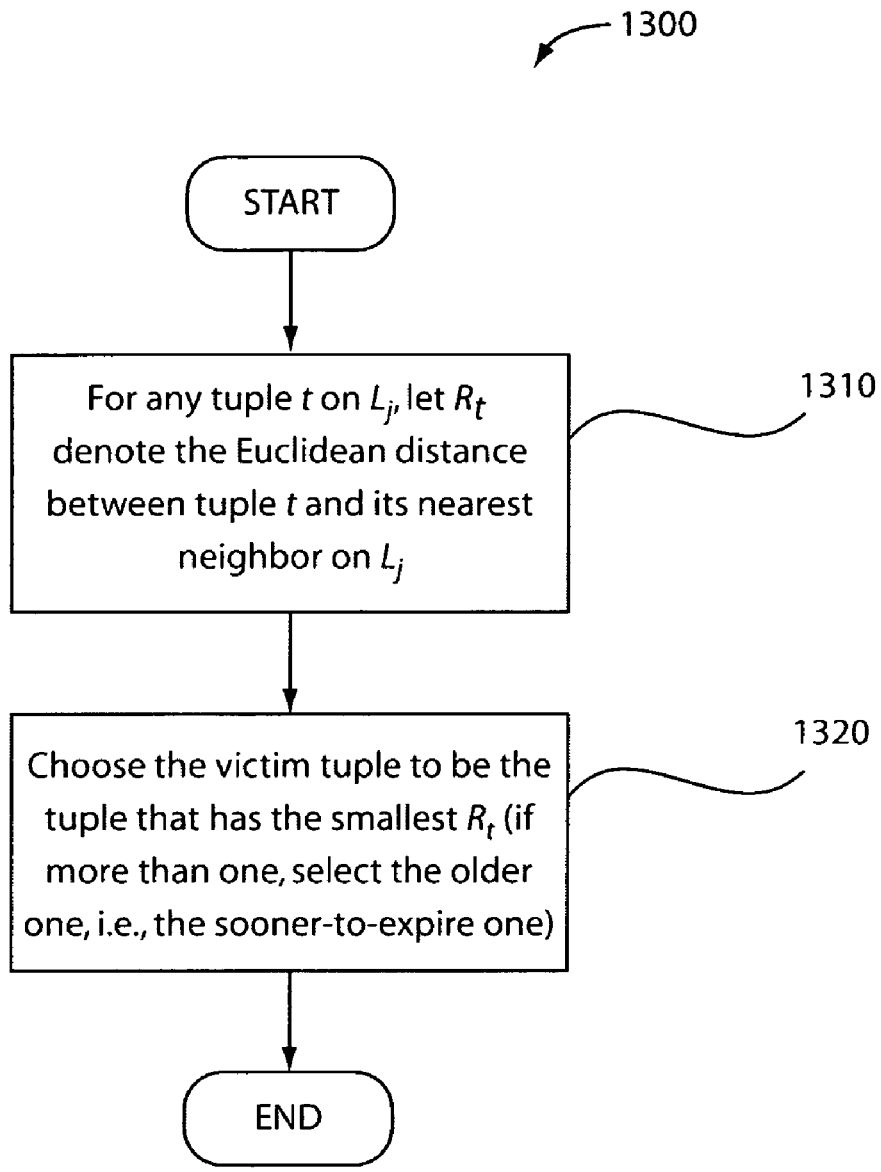
FIG. 13 is a flow diagram illustrating an exemplary method for selecting a victim tuple with respect to the dynamic, non-uniform storage allocation method 1100 of FIG. 11, according to an embodiment of the present principles.

Turning to FIG. 13, an exemplary method for selecting a victim tuple with respect to the dynamic, non-uniform storage allocation method 1100 of FIG. 11 is indicated generally by the reference numeral 1300.

Now one victim tuple needs to be deleted from the victim approximate convex layer $L_j$. Intuitively, this victim tuple t should have a close neighbor so that deleting t will have little impact on the shape of $L_j$. Two tuples on an approximate convex layer are neighbors if they are connected by an edge.

For any tuple t on $L_j$, let $R_t$ denote the Euclidean distance between tuple t and its nearest neighbor on $L_j$ (step 1310). The victim tuple is chosen to be the tuple that has the smallest $R_t$ (usually there are two such tuples and the older one, i.e., the sooner-to-expire one, is picked) (step 1320). Note that $R_t$ is not the smallest distance between tuple t and any other tuple on $L_j$. Rather, in computing $R_t$, only tuple t's neighbors are considered.

For illustrative purposes, an example will now be provided to illustrate the reasoning. Consider the victim approximate convex layer $L_j$ of an SAO index in two-dimension space according to an exemplary embodiment of the present principles, shown in FIG. 14. If $R_t$ denotes the smallest distance between tuple t and any other tuple on $L_j$, then tuples $t_1$ and $t_3$ have the smallest $R_t$. Suppose $t_3$ is older than $t_1$. In this case, $t_3$ is picked as the victim tuple and deleted from $L_j$. This greatly influences the shape of $L_j$. There are two possible cases, and problems may possibly be encountered in either case.

Figure 14:
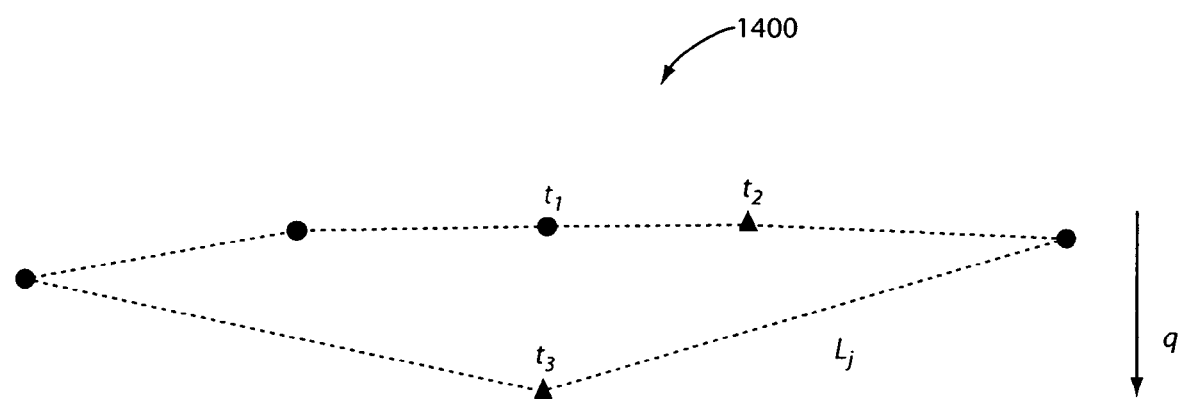
FIG. 14 is diagram illustrating a top-K linear optimization query q to which the present principles may be applied, according to an embodiment thereof.

In the first case, j=L. Turning to FIG. 14, a top-K linear optimization query q (having a direction as shown) is indicated generally by the reference numeral 1400. Suppose the Kth largest tuple of q comes from $L_L$. Then, the SAO index cannot provide a good answer for the Kth largest tuple of q, since the information about all tuples inside $L_L$ is lost.

In the second case, j<L. Due to the dramatic shape change of $L_j$, it is likely that after deleting $t_3$, $L_j$ will overlap with $L_{j+1}$. In this second case, as will be described herein below with respect to the index maintenance, the SAO index needs to adjust $L_{j+1}$ and maybe some approximate convex layers inside $L_{j+1}$. This is rather time-consuming.

In contrast, if $R_t$ denotes the distance between tuple t and its nearest neighbor on $L_j$, then tuples $t_1$ and $t_2$ have the smallest $R_t$. Irrespective of whether $t_1$ or $t_2$ is deleted from $L_j$, there is only a minor change to the shape of $L_j$ and, thus, we are not likely to run into the trouble described above.

With respect to deleting a victim tuple, after choosing the victim tuple t, we may use the method that is described with respect to step 1520 of FIG. 15 herein below with respect to index maintenance, to delete t from $L_j$ and then adjust the affected approximate convex layers.

A description will now be given regarding index creation for an embodiment of an SAO index in accordance with the present principles. At the beginning, the SAO index is empty. We keep receiving new tuples until there are M tuples. Then, a standard convex hull construction algorithm, such as the quickhull method, may be used to create the L approximate convex layers in a batch. This is mainly for efficiency purposes, as creating convex hulls in batch is less expensive than constructing convex hulls incrementally (i.e., each time adding one new tuple). Note that it is possible that some of the innermost approximate convex layers are empty. Of course, it is to be appreciated that other convex hull construction methods may also be employed to construct an SAO index in accordance with the present principles, while maintaining the scope of the present principles.

From now on, each time a new tuple arrives, we use the method described herein below with respect to index maintenance to incrementally maintain the SAO index. It is to be appreciated that the embodiment of the present principles are not limited to the preceding methodologies with respect to index creation and, thus, other methodologies may also be employed while maintaining the scope of the present principles.

Embodiments of an SAO index in accordance with the present principles may employ index maintenance. It is to be appreciated that the following embodiments relating to index maintenance are merely illustrative and, given the teachings of the present principles provided herein, one of ordinary skill in this and related arts may utilize the following and other methodologies for index maintenance for an SAO index, while maintaining the scope of the present invention.

In a typical data streaming environment, we expect that W>>M. That is, only a small fraction of all W tuples in the sliding window are stored in the SAO index. Intuitively, this means that tuples on the approximate convex layers can be regarded as anomalies. The smaller the i ($1 \leq i \leq L$), the more anomalous the tuples on $L_i$. As a result, we have the following heuristic (not exact) property:

Property 2: Most new tuples are "normal" tuples and thus inside $L_L$. Moreover, for a new tuple t, it is most likely to be inside $L_L$. Less likely is tuple t between $L_{L-1}$ and $L_L$, and even less likely is tuple t between $L_{L-2}$ and $L_{L-1}$, etc.

According to our exemplary storage allocation strategies described herein above, the inner approximate convex layers tend to have fewer tuples than the outer approximate convex layers. From computational geometry literature, it is known that given a point p, the complexity of checking whether p is inside a convex polytope P increases with the number of vertices of P. Therefore, we have the following property:

Property 3: For a tuple t, it is typically faster to check whether t is inside an inner approximate convex layer than to check whether t is inside an outer approximate convex layer.

Figure 15:
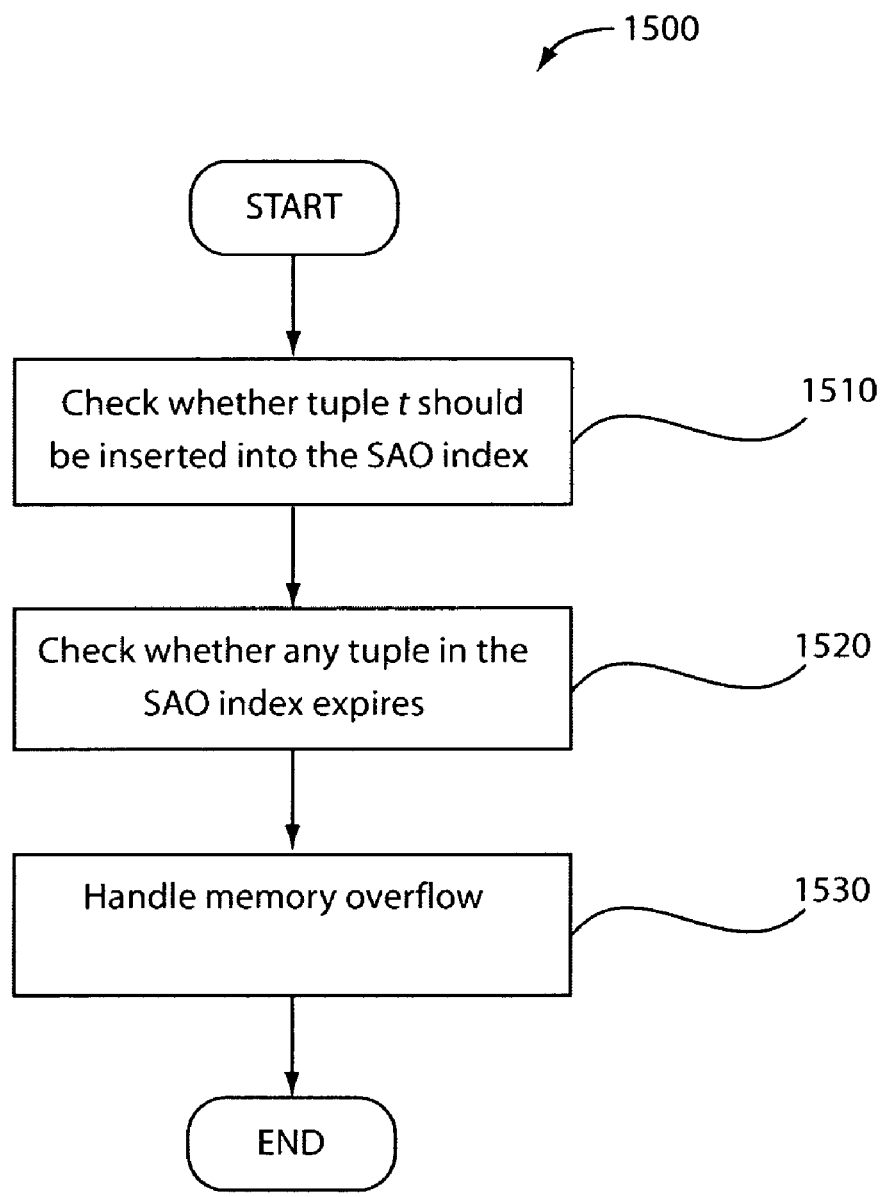
FIG. 15 is a flow diagram illustrating an exemplary method for maintaining an SAO index, according to an embodiment of the present principles.

Turning to FIG. 15, an exemplary method for maintaining an SAO index is indicated generally by the reference numeral 1500.

Upon the arrival of a new tuple t, Properties 2 and 3 may be used to reduce the SAO index maintenance overhead. We may proceed in the following exemplary three steps. Step 1510 checks whether tuple t should be inserted into the SAO index. Step 1520 checks whether any tuple in the SAO index expires. Step 1530 handles memory overflow.

A description of an illustrative embodiment of step 1510 of FIG. 15 relating to tuple insertion for the purpose of index maintenance will now be described with respect to the present principles.

Figure 16:
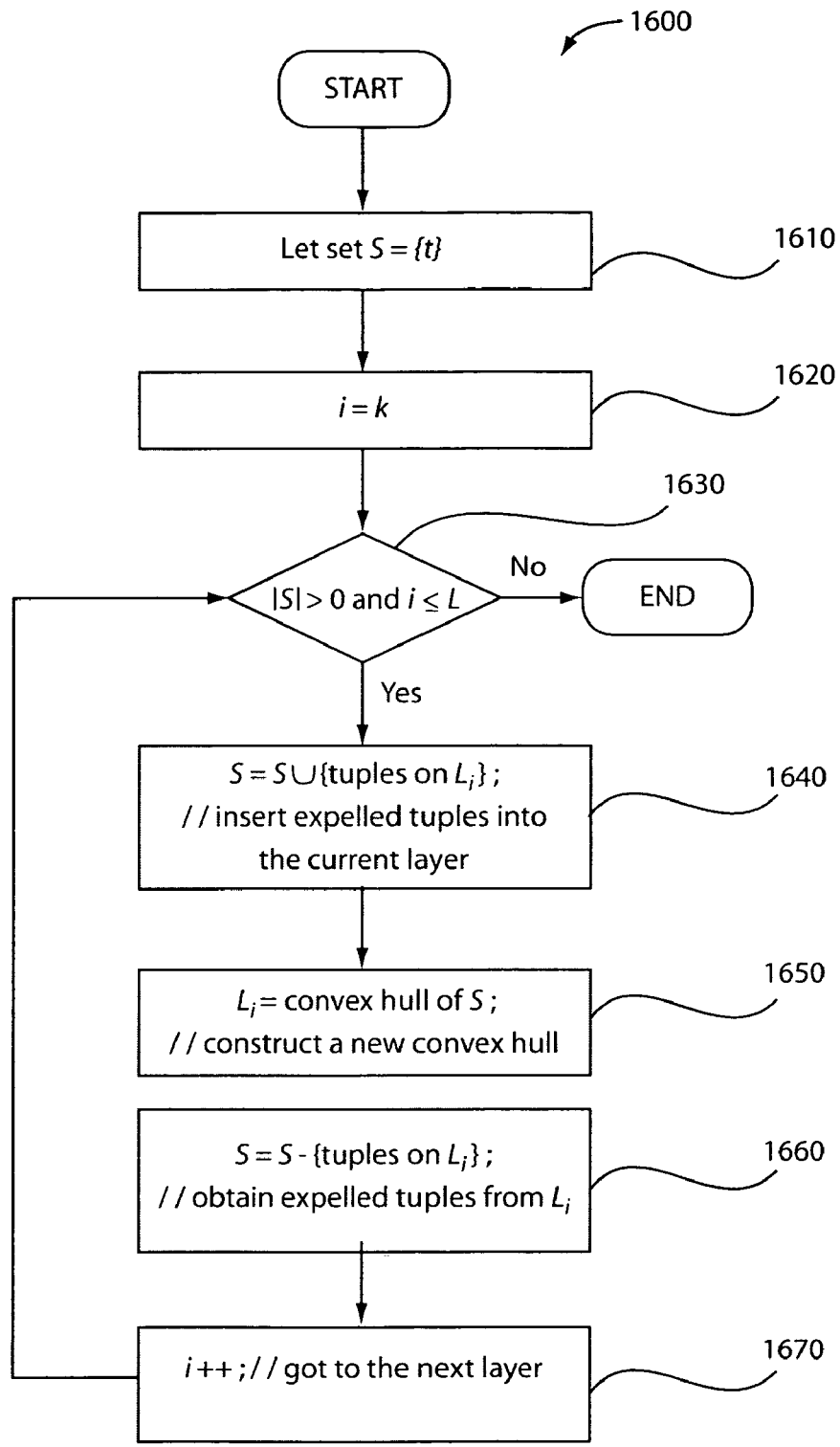
FIG. 16 is a flow diagram illustrating an exemplary method for tuple insertion with respect to the index maintenance method 1500 of FIG. 15, according to an embodiment of the present principles.

Turning to FIG. 16, an exemplary method for tuple insertion with respect to the index maintenance method 1500 of FIG. 15 is indicated generally by the reference numeral 1600.

Let set S={t} (step 1610). Set i=k (step 1620). It is then determined whether or not |S|>0 && i$\leq$L (step 1630). If not, then the method is terminated. Otherwise, the expelled tuples are inserted into the current layer such that S=S$\cup${tuples on $L_i$} (step 1640). A new convex hull is constructed such that $L_i$=convex hull of S (step 1650). The expelled tuples are obtained from $L_i$ such that S=S−{tuples on $L_i$} (step 1660). The method increments i (i++) to proceed to the next layer (step 1670), and then returns to step 1630.

All approximate convex layers are checked one by one, starting from $L_L$. That is, our checking direction is from the innermost approximate convex layer to the outermost approximate convex layer. From Properties 2 and 3 together with the procedure described below, it can be seen that this checking direction is the most efficient one.

There are two possible cases. In the first case, tuple t is inside $L_L$. According to Property 2, this is the mostly likely case. Also, according to Property 3, it can be discovered quickly whether tuple t is inside $L_L$. In this first case, tuple t will not change any of the L approximate convex layers and thus can be thrown away immediately. Since no new tuple is introduced into the SAO index, there will be no memory overflow and, thus, Step 1530 can be skipped, although Step 1520 still needs to be performed. Note: If $L_L$ is empty, we may consider that tuple t is outside of $L_L$.

In the second case, a number k ($1 \leq k \leq L$) can be located such that tuple t is inside $L_{k-1}$ but outside of $L_k$. If k=1, then tuple t is outside of all L approximate convex layers. In this case, tuple t should be inserted into the SAO index. This insertion will affect $L_k$ and maybe some approximate convex layers inside $L_k$. However, none of the first k−1 approximate convex layers will be affected.

This insertion is done in the following way. The new $L_k$ is computed by considering both tuple t and all tuples on the existing $L_k$, using any standard incremental convex hull maintenance algorithm such as the beneath-beyond method. This may cause one or more tuples to be expelled from $L_k$. If that happens, the expelled tuples need to be further inserted into the next layer $L_{k+1}$. In other words, the new $L_{k+1}$ is computed by considering both the expelled tuples and all tuples on the existing $L_{k+1}$. This may again expel some tuples from $L_{k+1}$. The iteration continues until either $L_L$ is reached or no more tuples are expelled.

An exemplary embodiment of the insertion procedure is described below in pseudo code:

```
Let set S = {t};
i = k;
while (|S|>0 && i≤L) {
    S = S ∪ {tuples on L_i}; // insert expelled tuples into the current layer
    L_i = convex hull of S; // construct a new convex hull
    S = S − {tuples on L_i}; // obtain expelled tuples from L_i
    i++; // go to the next layer
}
```

Figure 17A:
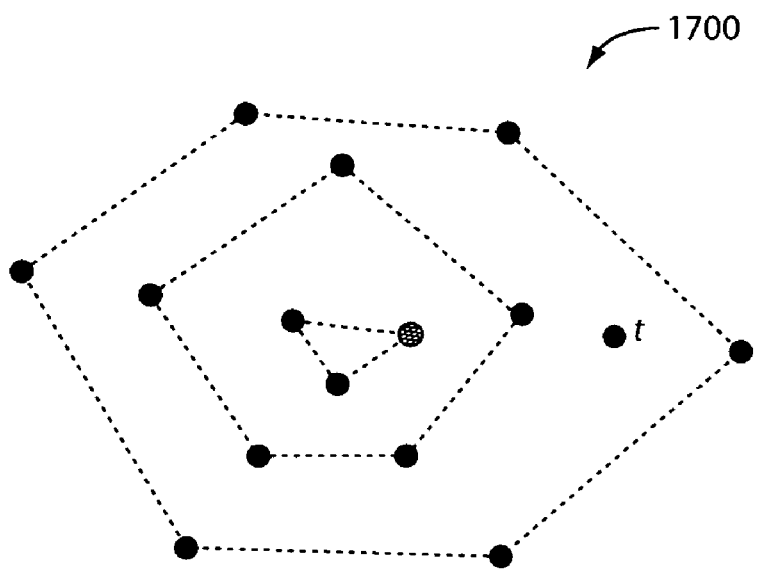
FIGS. 17A and 17B are diagrams illustrating an example of inserting a new tuple t into a SAO index 1700, according to an embodiment of the present principles.
Figure 17B:
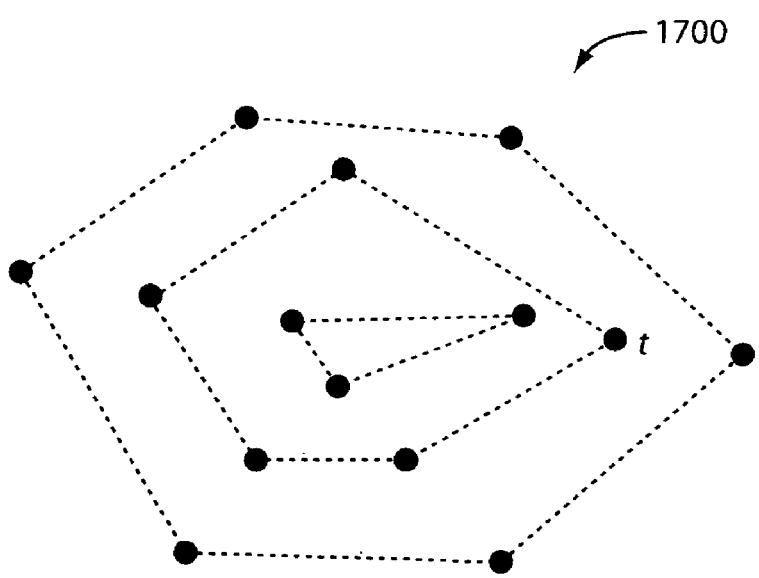

FIGS. 17A and 17B are diagrams illustrating an example of inserting a new tuple t into a SAO index 1700. In particular, FIG. 17A relates to a time before inserting a tuple t, and FIG. 17B relates to a time after inserting a tuple t.

A description of an illustrative embodiment of step 1520 of FIG. 15. relating to tuple expiration for the purpose of index maintenance will now be described with respect to the present principles.

Figure 18:
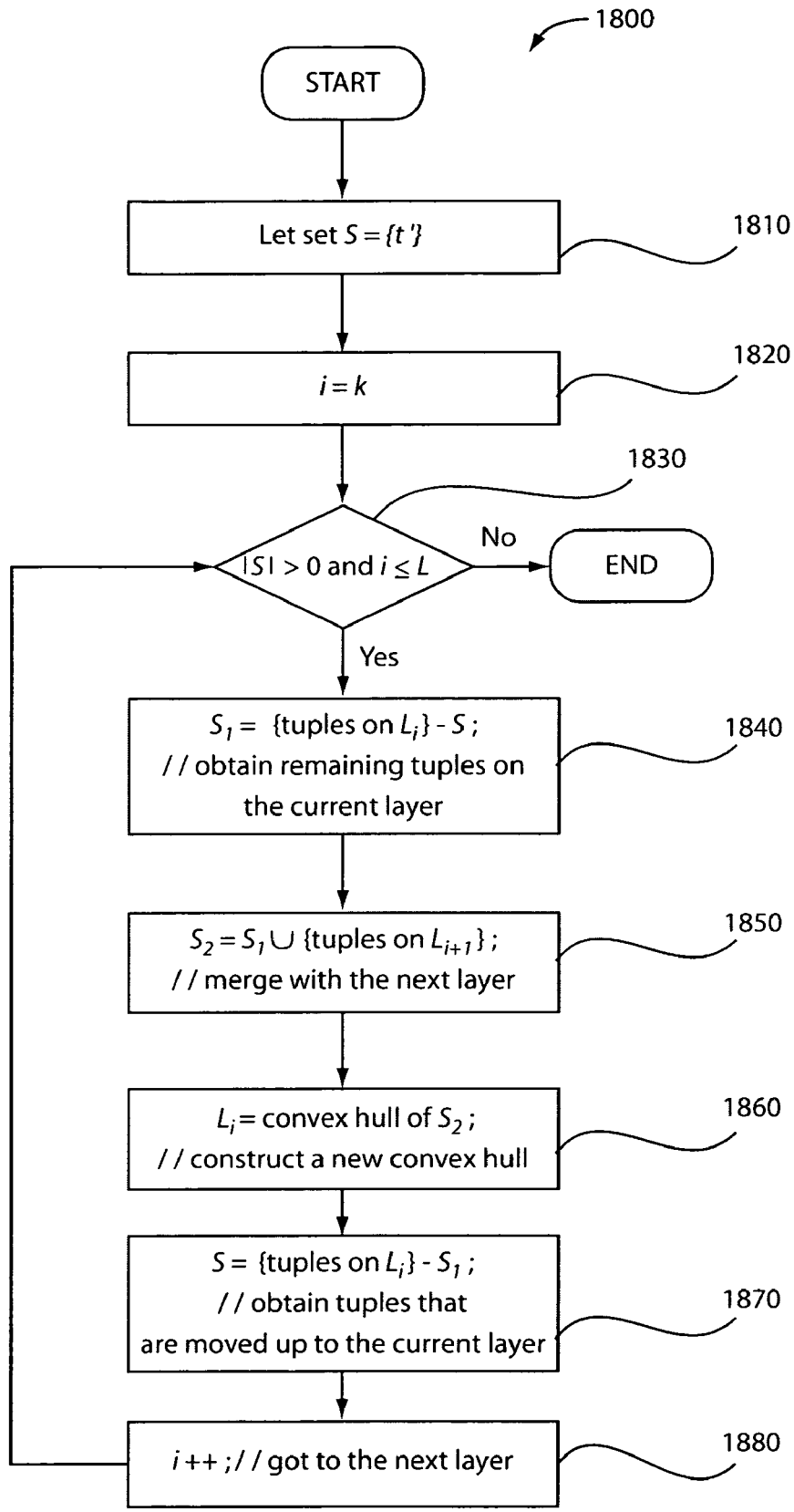
FIG. 18 is a flow diagram illustrating an exemplary method for tuple expiration with respect to the index maintenance method 1500 of FIG. 15, according to an embodiment of the present principles.

Turning to FIG. 18, an exemplary method for tuple expiration with respect to the index maintenance method 1500 of FIG. 15 is indicated generally by the reference numeral 1800.

Let set S={t'} (step 1810). Set i=k (step 1820). It is then determined whether or not |S|>0 && i≦L (step 1830). If not, then the method is terminated. Otherwise, the remaining tuples on the current layer are obtained such that $S_1$={tuples on $L_i$}−S (step 1840). The remaining tuples are merged with the next layer such that $S_2 = S_1 \cup$ {tuples on $L_{i+1}$} (step 1850). A new convex hull is constructed such that $L_i$=convex hull of $S_2$ (step 1860). Tuples from a lower layer are obtained for moving up to the current layer such that S={tuples on $L_i$}−$S_1$ (step 1870). The method increments i (i++) to proceed to the next layer (step 1880), and then returns to step 1830.

The arrival of tuple t will cause at most one tuple in the SAO index to expire from the sliding window. Let t' denote the first tuple in the doubly-linked list $L_{dl}$. Recall that all tuples in $L_{dl}$ are sorted in ascending order of their remaining lifetimes. Hence, only tuple t' needs to be checked, as t' is the only tuple in the SAO index that may expire from the sliding window.

There are two possible cases. In the first case, tuple t' has not expired. We proceed to Step 1530 directly.

In the second case, tuple t' has expired and thus needs to be deleted from the SAO index. Suppose tuple t' is on $L_k$ (1≦k≦L). The deletion of tuple t' will affect $L_k$ and maybe some approximate convex layers inside $L_k$. However, none of the first k−1 approximate convex layers will be affected.

This deletion is implemented as follows. The new $L_k$ is computed by considering both all tuples on the existing $L_k$ (except for tuple t') and all tuples on $L_{k+1}$. If one or more tuples on $L_{k+1}$ are moved up to the new $L_k$, then the new $L_{k+1}$ needs to be further computed by considering both the remaining tuples on $L_{k+1}$ and all tuples on $L_{k+2}$. The iteration continues until either $L_L$ is reached or no more tuples are moved up. Since this iteration procedure reduces the number of tuples in the SAO index by one, there will be no memory overflow and, thus, Step 1530 can be skipped.

The deletion procedure is described herein after in pseudo code.

```
Let set S = {t'};
i = k;
while (|S|>0 && i≦L) {
    S1 = {tuples on Li} − S; // obtain remaining tuples on
    the current layer
    S2 = S1 ∪ {tuples on Li+1}; // merge with the next
    layer
    Li = convex hull of S2; // construct a new convex hull
    S = {tuples on Li} − S1; // obtain tuples that are
    moved up to the current layer
    i++; // go to the next layer
}
```

Figure 19A:
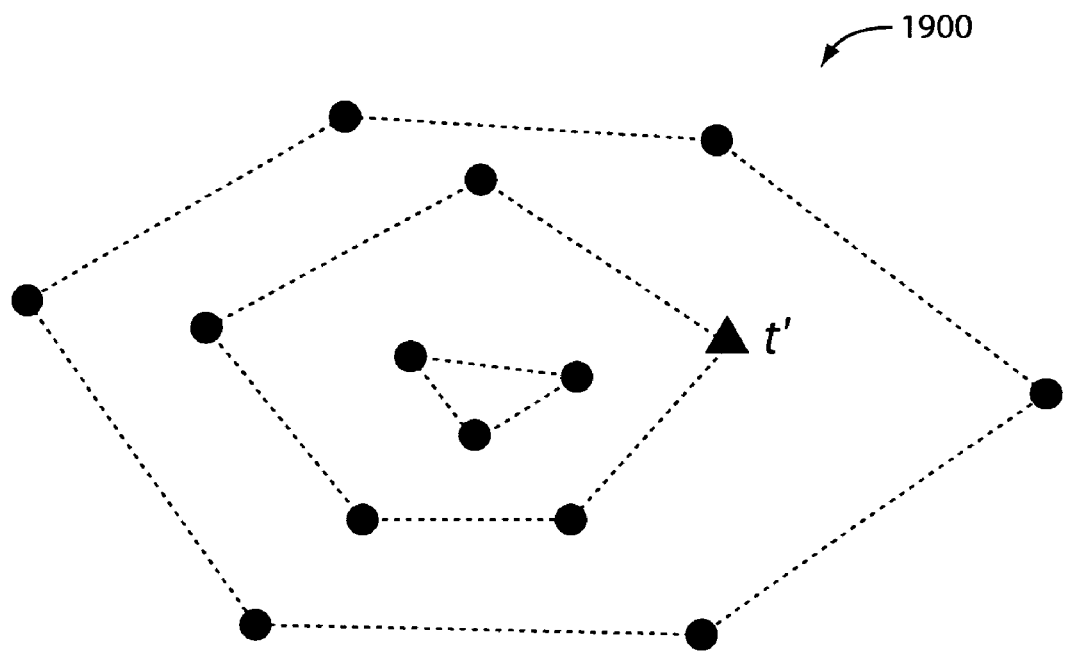
FIGS. 19A and 19B are diagrams illustrating an example of deleting a tuple t' from a SAO index 1900 according to the present principles, according to an embodiment of the present principles.
Figure 19B:
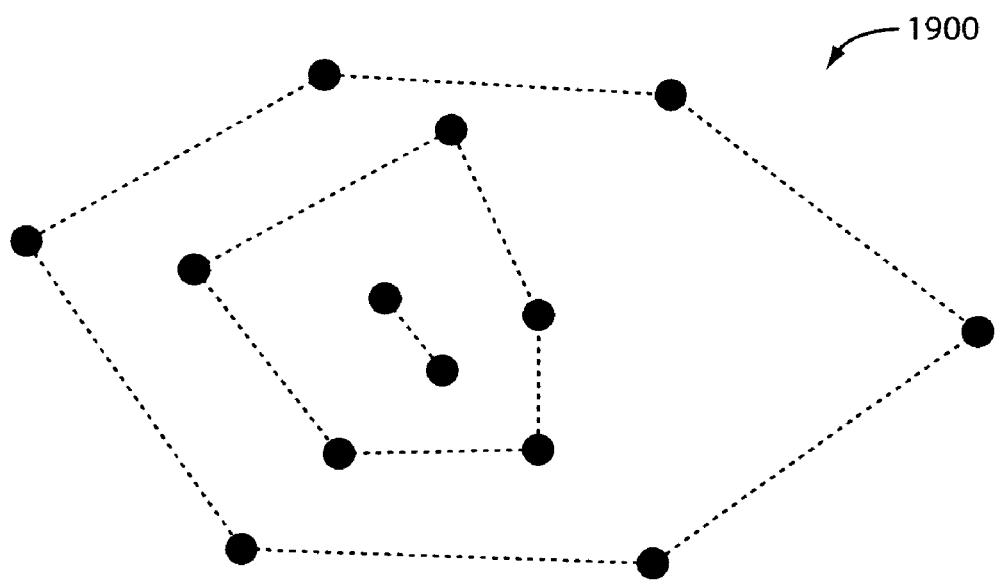

FIGS. 19A and 19B are diagrams illustrating an example of deleting a tuple t' from a SAO index 1900 according to the present principles. In particular, FIG. 19A illustrates an example corresponding to a time before a tuple t is deleted, and FIG. 19B illustrates an example corresponding to a time after tuple t has been deleted.

A description of an illustrative embodiment of step 1530 of FIG. 15 relating to the handing of memory overflow will now be described with respect to the present principles.

In the above steps 1510 and 1520, at most one new tuple is introduced into the SAO index while one or more tuples may be deleted (e.g., tuples may get expelled from $L_L$ in Step 1510). Now we check whether or not the condition $$\sum_{i=1}^{L} M_i \leq M$$

still holds. Recall that $M_i$ denotes the number of tuples on $L_i$. If not, $$\sum_{i=1}^{L} M_i = M + 1$$

must be true. In this case, we use the procedure that is described above with respect to index maintenance to delete one tuple from the SAO index.

From the above description, we can see that it may be computationally expensive to either insert a new tuple into the SAO index or delete an existing tuple from the SAO index, as multiple approximate convex layers may need to be reconstructed. Fortunately, upon the arrival of a new tuple, the amortized overhead of maintaining the SAO index is not that high. The reason is as follows.

First, according to Property 2, in most cases, the new tuple will be inside the innermost approximate convex layer $L_L$ and, thus, can be thrown away immediately. Also, the number of tuples in the SAO index is at most M+1, which is usually much smaller than the sliding window size W. On average, after approximately W/M new tuples are received, one tuple in the SAO index expires. Therefore, we rarely need to either insert a new tuple into the SAO index or delete a tuple from the SAO index.

Second, M is typically not very large. Then for each i (1≦i≦L), $M_i$, the number of tuples on $L_i$, is also not very large. This reduces the reconstruction overhead of approximate convex layers, and also the overhead of checking whether the new tuple is inside an approximate convex layer.

Third, the SAO index maintenance algorithm in accordance with the present principles has been optimized. For example, an efficient checking direction is used in Step 1510.

Embodiments of an SAO index in accordance with the present principles may employ a query evaluation procedure. It is to be appreciated that the following embodiments relating to query evaluation are merely illustrative and, given the teachings of the present principles provided herein, one of ordinary skill in this and related arts may utilize the following and other methodologies for query evaluation for an SAO index, while maintaining the scope of the present invention.

To provide approximate answers to a top-K linear optimization query (K can be larger than L), in some embodiments, we may employ the onion index search procedure described in the above-referenced "Onion Technique Article". We start from $L_1$ and search the approximate convex layers one by one. This search terminates when one of the following two conditions are satisfied: (1) all L approximate convex layers have been searched (in this case, all L approximate convex layers are treated as previous approximate convex layers); or (2) the Kth largest tuple on the previous approximate convex layers has larger linear combination value than the largest tuple on the current approximate convex layer. Then the top-K tuples on the previous approximate convex layers are returned to the user. According to Theorem 1, these K tuples are the top-K tuples in the SAO index.

Embodiments of an SAO index in accordance with the present principles may be implemented in a parallel processing environment. The above discussion assumes that there is only one computer. If tuples arrive so rapidly that one computer cannot handle all of them, multiple (e.g., C) computers can be used. An illustrative embodiment involving parallel processing may be implemented as follows. All tuples are partitioned into C sets (e.g., using round-robin partitioning). Each computer maintains a SAO index and handles a different set of tuples. When the user submits a top-K linear optimization query, the local top-K tuples are obtained on each computer. All these local top-K tuples are merged together to get the global top-K tuples. This is our answer to the top-K linear optimization query.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A method for indexing a data stream having attribute values, comprising:

storing the data stream in a hardware memory device;

parsing the data stream in the hardware memory device;

forming a Stream Approximate Onion (SAO) index of tuples for a subset of attribute values of the data stream, the index being configured for retrieving top-K tuples that optimize linearly weighted sums of at least some of the attribute values in the subset; and configuring the index to track a subset of the top-K tuples in a sliding window applied to the data stream;

wherein said forming step comprises forming the index to have a plurality of layers of convex hulls, and the method further comprises:

maintaining in the index a number of the plurality of layers of convex hulls less than a number of convex hull layers maintained in an Onion index;

storing the index in the hardware memory device or another hardware memory device; and providing a user-discernable output based on the index in response to an optimization query directed to the data stream, the user discernable output including the top-K tuples that optimize the linearly weighted sums of at least some of the attribute values in the subset with respect to the optimization query.

* * * * *